US008462253B2

(12) United States Patent
Hasegawa et al.

(10) Patent No.: US 8,462,253 B2
(45) Date of Patent: Jun. 11, 2013

(54) MONITORING SYSTEM FOR A PHOTOGRAPHY UNIT, MONITORING METHOD, COMPUTER PROGRAM, AND STORAGE MEDIUM

(75) Inventors: Hiroyuki Hasegawa, Kanagawa (JP); Hideki Hama, Tokyo (JP); Hiroshi Nedu, Chiba (JP); Takeyoshi Kuroya, Shizuoka (JP); Masaaki Kurebayashi, Shizuoka (JP)

(73) Assignee: Sony Corporation, Tokyo (JP)

( * ) Notice: Subject to any disclaimer, the term of this patent is extended or adjusted under 35 U.S.C. 154(b) by 415 days.

(21) Appl. No.: 12/398,489

(22) Filed: Mar. 5, 2009

(65) Prior Publication Data

US 2009/0213209 A1 Aug. 27, 2009

Related U.S. Application Data

(63) Continuation of application No. 11/732,665, filed on Apr. 4, 2007, now Pat. No. 7,924,318, which is a continuation of application No. 10/427,859, filed on May 1, 2003, now Pat. No. 7,218,352.

(30) Foreign Application Priority Data

May 2, 2002 (JP) ................................. 2002-130761
May 2, 2002 (JP) ................................. 2002-130762

(51) Int. Cl.
*H04N 7/00* (2006.01)
*H04N 5/232* (2006.01)
*H04N 5/235* (2006.01)
*H04N 5/222* (2006.01)

(52) U.S. Cl.
USPC ..................... 348/333.01; 348/39; 348/218.1; 348/211.8

(58) Field of Classification Search
USPC ........... 348/39, 211.8, 218.1, 333.01, 333.02, 348/333.05, 333.11
See application file for complete search history.

(56) References Cited

U.S. PATENT DOCUMENTS

| | | | | |
|---|---|---|---|---|
| 6,091,771 | A | 7/2000 | Seeley et al. | |
| 6,466,254 | B1 | 10/2002 | Furlan et al. | |
| 6,624,846 | B1 | 9/2003 | Lassiter | 348/211.4 |
| 2003/0071891 | A1 | 4/2003 | Geng | 348/39 |

FOREIGN PATENT DOCUMENTS

| | | |
|---|---|---|
| EP | 0 878 965 | 11/1998 |
| EP | 1 158 473 | 11/2001 |
| EP | 1 162 830 | 12/2001 |
| JP | 5 242167 | 9/1993 |
| JP | 9 233384 | 9/1997 |
| JP | 10 164563 | 6/1998 |
| JP | 10 290387 | 10/1998 |

(Continued)

*Primary Examiner* — Timothy J Henn
(74) *Attorney, Agent, or Firm* — Frommer Lawrence & Haug LLP; William S. Frommer

(57) ABSTRACT

A coverage area picture imaging a maximum area is displayed on a coverage area picture display. A camera is moved within a predetermined range and a plurality of frames obtained as a result form a picture. The pixels of the picture is decimated in vertical and horizontal directions and form a thumbnail as the coverage area picture. The coverage area picture display presents a display indicating a direction in which the camera is currently directed for picture photographing. In accordance with the display, a photographing direction is controlled. A plurality of frames are photographed with respect to a designated position, then stored, and displayed. A whole picture display presents a whole panorama picture. A selective picture display presents a frame at the position designated within the whole panorama picture as a selected picture.

12 Claims, 15 Drawing Sheets

FOREIGN PATENT DOCUMENTS

| | | |
|---|---|---|
| JP | 10 290412 | 10/1998 |
| JP | 11 8845 | 1/1999 |
| JP | 11 88767 | 3/1999 |
| JP | 11 252534 | 9/1999 |
| JP | 2000 224542 | 8/2000 |
| JP | 2001 251607 | 9/2001 |
| JP | 2001 325695 | 11/2001 |

MONITORING SYSTEM FOR A PHOTOGRAPHY UNIT, MONITORING METHOD, COMPUTER PROGRAM, AND STORAGE MEDIUM

This application is a Continuation Application of U.S. application Ser. No. 11/732,665, filed Apr. 4, 2007, now U.S. Pat. No. 7,924,318 which is a Continuation Application of U.S. application Ser. No. 10/427,859 filed on May 1, 2003, now U.S. Pat. No. 7,218,352, which claims the benefit of Japanese Application 2002-130761 filed May 2, 2002 and Japanese Application 2002-130762 filed May 2, 2002. All of which are hereby incorporated by reference in their entirety herein.

BACKGROUND OF THE INVENTION

1. Field of the Invention

The present invention relates to a monitoring system, monitoring method, computer program and storage medium for use with a surveillance camera.

2. Description of the Related Art

Monitoring systems for monitoring a wide area are conventionally used. For example, a monitoring system may be used for surveillance of sea and river regions, monitoring of trespassers, monitoring of the behavior of wild animals, and for other purposes. A video camera having a large number of pixels is used to capture the image of a wide area. For this reason, the cost of the system typically becomes higher. A technique has been proposed which captures a still picture by shifting successively capture areas from one to another and then linking the still pictures to generate a picture of the area to be monitored. The whole picture has an extremely high resolution. When an expanded picture of one portion of the whole picture is obtained, the resolution of the expanded picture is still high and a clear image thus results.

To capture the picture of a wide area, the number of still pictures forming the whole picture of the wide area increases. Time required to capture still frame pictures forming the whole picture is prolonged. In practice, an area to be monitored is typically limited. The monitoring system is preferably usable in a dark environment under which the naked eye of the human is unable to see objects. Using an infrared camera, the monitoring system may have a dark vision feature. However, captured image is typically dark and unclear to identify. The operability of the monitoring system is not satisfactory because of image darkness particularly when the user attempts to direct the camera to a desired direction while viewing the captured picture, or when the user attempts to expand an arbitrary point or area in the captured picture.

SUMMARY OF THE INVENTION

Accordingly, it is an object of the present invention to provide a monitoring system, monitoring method, computer program and storage medium for displaying a whole picture to be monitored, and retrospectively reproducing and displaying past frames with respect to an arbitrary position.

It is another object of the present invention to provide a monitoring system, monitoring method, computer program and storage medium appropriate for monitoring an actually desired area, and easily operated to control the direction of a camera under a dark environment that results in a dark picture.

In a first aspect of the present invention, a monitoring system includes a picture photographing unit for photographing a picture, a photographing direction varying unit for varying a photographing direction of the picture photographing unit, a storage unit for storing picture data, a picture display unit, and a controller which stores, in the storage unit, one of a source picture including a plurality of still frame pictures photographed in the photographing directions within a predetermined coverage area within a predetermined range of the photographing direction varying unit and a picture which is obtained by compressing the source picture, and displays, on the picture display unit, a whole panorama picture generated from the one of the source picture and the compressed picture, wherein a picture within the predetermined coverage area is photographed with the picture photographing direction varied, the coverage area picture is displayed on the picture display unit, the photographing direction is controlled to a desired position by designating the desired position within the coverage area picture, and the whole panorama picture captured with respect to the designated position is displayed on the picture display unit.

In a second aspect of the present invention, a monitoring method for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture, includes the steps of photographing a coverage area picture with the photographing direction varied to display the coverage area picture, and controlling the photographing direction to a desired position by designating the desired position within the coverage area picture to display the whole panorama picture photographed with respect to the designated position.

In a third aspect of the present invention, a computer executable program for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture, includes program codes for performing the steps of photographing a coverage area picture with the photographing direction varied to display the coverage area picture, and controlling the photographing direction to a desired position by designating the desired position within the coverage area picture to display the whole panorama picture captured with respect to the designated position.

In a fourth aspect of the present invention, a computer readable storage medium stores a computer executable program for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture. The computer executable program includes program codes for performing the steps of photographing a coverage area picture with the photographing direction varied to display the coverage area picture, and controlling the photographing direction to a desired position by designating the desired position within the coverage area picture to display the whole panorama picture captured with respect to the designated position.

The period of time required to capture the whole panorama picture is prevented from being prolonged because the picture photographing unit is not fully moved within the predetermined range. Since the coverage area picture with the picture photographing unit fully moved within the predetermined range is displayed, the photographing direction to obtain the picture of a desired area is easily set. Even if the picture being photographed is dark, the photographing direction is easily set. The operability of the system is improved.

In a fifth aspect of the present invention, a monitoring system includes a picture photographing unit for photographing a picture, a photographing direction varying unit for varying a photographing direction of the picture photographing unit, a storage unit for storing picture data, a picture display unit, and a controller which stores, in the storage unit, one of a source picture including a plurality of still frame pictures photographed in the photographing directions within a predetermined coverage area within a predetermined range of the photographing direction varying unit and a picture which is obtained by compressing the source picture, and displays, on the picture display unit, a whole panorama picture generated from the one of the source picture and the compressed picture, wherein an arbitrary point of the picture display unit is indicated, only a still frame picture at the indicated arbitrary point is photographed by the picture photographing unit, and the photographed still frame picture is displayed on the picture display unit at a predetermined position thereof.

In a sixth aspect of the present invention, a monitoring system includes a picture photographing unit for photographing a picture, a photographing direction varying unit for varying a photographing direction of the picture photographing unit, a storage unit for storing picture data, a picture display unit, and a controller which stores, in the storage unit, one of a source picture including a plurality of still frame pictures photographed in the photographing directions within a predetermined coverage area within a predetermined range of the photographing direction varying unit and a picture which is obtained by compressing the source picture, and displays, on the picture display unit, a whole panorama picture generated from the one of the source picture and the compressed picture, wherein an arbitrary point of the picture display unit is indicated, only a still frame picture at the indicated arbitrary point is read from one of the source picture and the compressed picture stored in the storage unit, and the read still frame picture is displayed on the picture display unit at a predetermined position thereof.

In a seventh aspect of the present invention, a monitoring method for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture, includes the steps of indicating an arbitrary point within the whole panorama picture, photographing only a still frame picture at the indicated arbitrary point, and displaying the photographed still frame picture in the whole panorama picture at a predetermined position therewithin.

In an eighth aspect of the present invention, a computer executable program for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture, includes program codes for performing the steps of indicating an arbitrary point within the whole panorama picture, photographing only a still frame picture at the indicated arbitrary point, and displaying the photographed still frame picture in the whole panorama picture at a predetermined position therewithin.

In a ninth aspect of the present invention, a computer executable program for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture, includes program codes for performing the steps of indicating an arbitrary point within the whole panorama picture, reading only a still frame picture at the indicated arbitrary point from the stored source pictures and the stored compressed pictures, and displaying the read still frame picture in the whole panorama picture at a predetermined position therewithin.

In a tenth aspect of the present invention, a storage medium stores a computer executable program for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture. The computer executable program includes program codes for performing the steps of indicating an arbitrary point within the whole panorama picture, photographing only a still frame picture at the indicated arbitrary point, and displaying the photographed still frame picture in the whole panorama picture at a predetermined position therewithin.

In an eleventh aspect of the present invention, a storage medium stores a computer executable program for storing one of a source picture including a plurality of still frame pictures photographed in photographing directions within a predetermined coverage area within a predetermined range of a photographing direction varying unit varying a photographing direction of a picture photographing unit, and a picture which is obtained by compressing the source picture, and for displaying a whole panorama picture generated from the one of the source picture and the compressed picture. The computer executable program includes program codes for performing the steps of indicating an arbitrary point within the whole panorama picture, reading only a still frame picture at the indicated arbitrary point from the stored source pictures and the stored compressed pictures, and displaying the read still frame picture in the whole panorama picture at a predetermined position therewithin.

Since an optical axis of the picture photographing unit is directed to the center of a still frame picture at an arbitrary point, the still frame picture at the arbitrary point is photographed and displayed while the whole panorama picture is displayed at the same time. Since a still frame picture at an arbitrary point is reproduced from already stored data, a still frame picture at an arbitrary point is reproduced and displayed in retrospect while the whole panorama picture is displayed at the same time.

DESCRIPTION OF THE PREFERRED EMBODIMENTS

Figure 1:
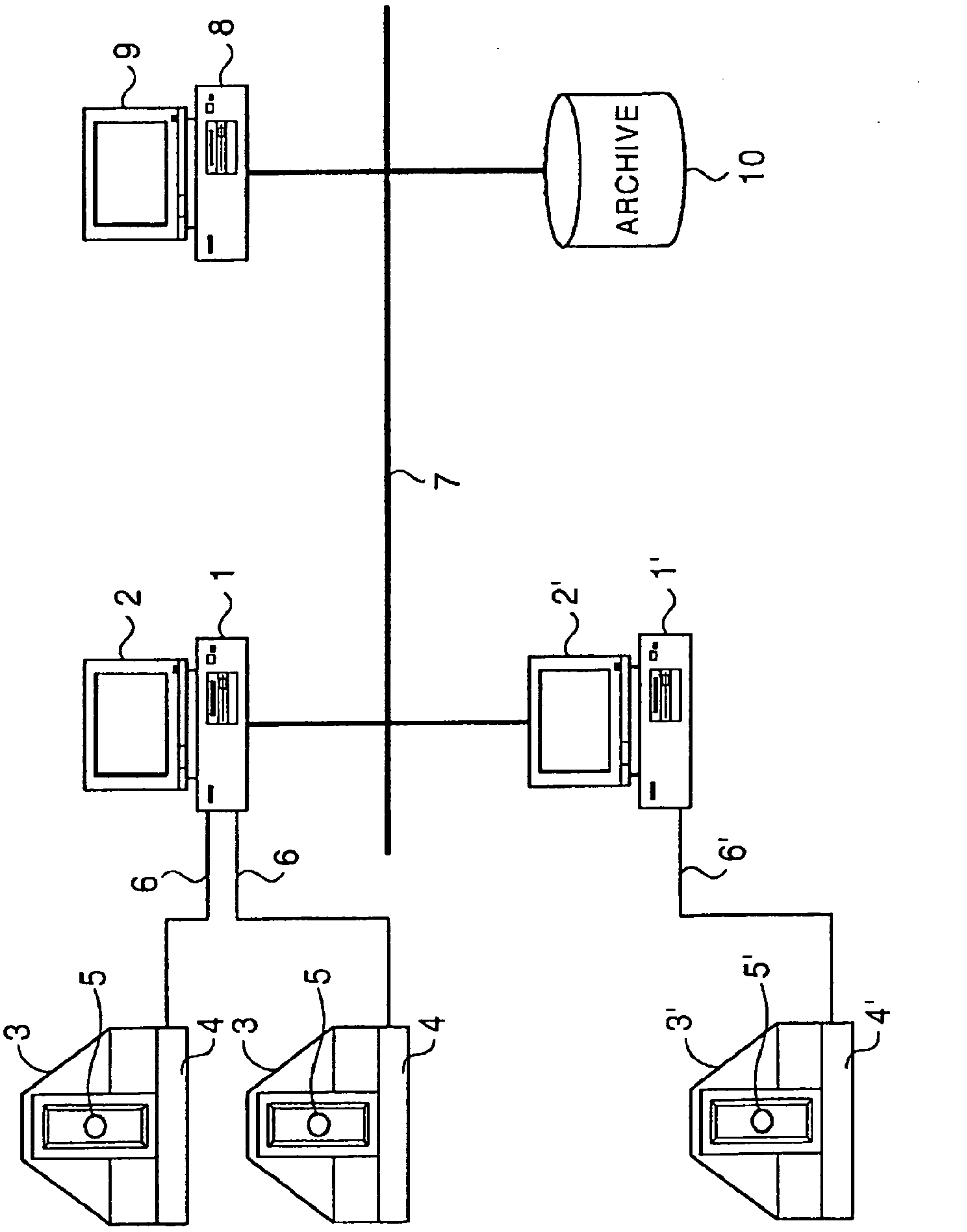
FIG. 1 is a block diagram diagrammatically illustrating a monitoring system in accordance one embodiment of the present invention.

One embodiment of the present invention will now be discussed with reference to the drawings. FIG. 1 is a block diagram diagrammatically illustrating a monitoring system in accordance one embodiment of the present invention. A computer 1, connected to a display 2, controls a camera unit 3. In the system shown in FIG. 1, the single computer 1 controls two camera units 3, and another computer 1', connected to another display 2', controls another camera unit 3'. In this way, a single computer controls a plurality of camera units 3.

The camera unit 3 is integrally formed of a pan and tilt section 4 and camera section 5. The camera unit 3 is mounted so that a remote target area is photographed. As an example, the camera section 5 has a telephoto lens with a magnification of 10 or 70, and takes a picture of an area several tens of meters to several kilometers away.

The camera section 5 is a digital still camera, which is turned on in synchronization with an external trigger. The image pickup device of the camera section 5, for example, a CCD (Charge-Coupled Device), has a resolution of 640×480 pixels (Video Graphics Array, VGA), resolution of 1024×768 pixels (extended Graphics Array, XGA), resolution of 1208×1024 pixels (Super extended Graphics Array, SXGA) or the like. If a VGA image pickup device is used, picture data is output at a rate of 30 fps (frames/second). If an XGA image pickup device is used, picture data is output at a rate of 15 fps. If an SXGA image pickup device is used, picture data is output at a rate of 7.5 fps.

Video data is transferred from the camera unit 3 to the computer 1 through a bus 6. The bus 6 allows the video data and a control signal of the camera unit 3 to be transferred therethrough. The above-discussed construction is also applied to the computer 1' and camera unit 3'.

The computers 1 and 1' store video data from the camera units 3 and 3', respectively. As will be discussed later, the computers 1 and 1' include GUI (Graphical User Interface) to control the camera units 3 and 3' respectively to photograph a target area desired by the user. The video data is compressed in accordance with JPEG (Joint Photographic Experts Group).

The computers 1 and 1' are mutually interconnected to each other through a LAN (Local Area Network). Another computer 8 is connected to the LAN 7. A display 9 is connected to the computer 8. The computer 8 receives picture data from the computers 1 and 1' through the LAN 7, stores the picture data in an archive 10, and processes the picture data. For example, the computer 8 performs face recognition, baggage recognition, environment recognition, vehicle recognition, etc. on the picture data. Like a tape streamer, the archive 10 stores a vast amount of data.

Figure 2:
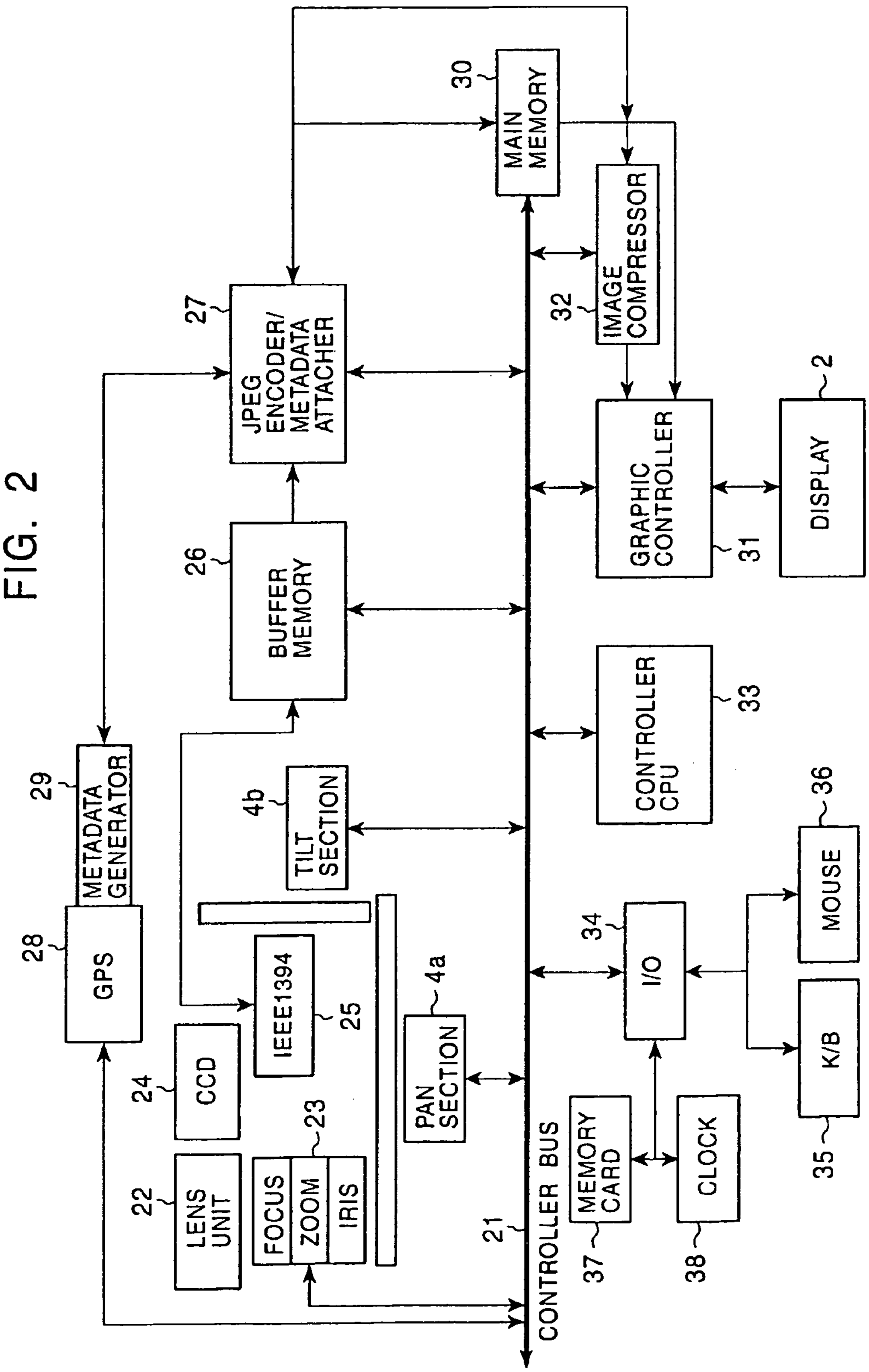
FIG. 2 is a block diagram of the embodiment of the present invention.

FIG. 2 illustrates the computer 1 and camera unit 3 in the monitoring system more in detail. As shown, components of the camera unit 3 and the computer 1 are connected to a controller bus 21.

The pan and tilt section 4 includes a pan part 4*a* and a tilt part 4*b*. The pan part 4*a* and tilt part 4*b* have respective sources of power such as stepping motors, and respectively pans and tilts the camera section 5 in response to a control signal which is supplied from a CPU (Central Processing Unit) 33 through the controller bus 21. The camera section 5 is mounted on the pan and tilt section 4. A panning operation refers to a movement in which a camera pans in a horizontal direction and a tilting operation refers to a movement in which the camera is vertically tilted. For example, a maximum pan angle is 180° and a maximum tilt angle is 50°.

As will be discussed later, the camera section 5 is movable within the maximum tilt angle range of ±15° and the maximum pan angle range of ±50°. Each time the center of a picture is shifted by an angle of view, the shutter of the camera section 5 is turned on to photograph still pictures (also simply referred to as frames) For example, a total of M×N frames (=8×16=128 frames, for example), namely, M frames (8 frames, for example) in a vertical direction and N frames (16 frames, for example) in a horizontal direction, are successively photographed, compressed, and then linked together to form a single whole picture. For example, each frame is an XGA (1024×768 pixels) picture. The total of 128 frames forms a picture of about 100 million pixels (16,384 (1024×16) pixels in a horizontal direction and 6,144 (768×8) pixels in a vertical direction), if an overlapping coverage is disregarded. It takes about five seconds for the system to take 128 frames. The overlapping coverage is typically 16 pixels in a vertical direction and 16 pixels in a horizontal direction.

The camera section 5 is a digital still camera, and includes a lens unit 22, focus-zoom-iris controller 23, and photographing unit 24. The focus-zoom-iris controller 23 is controlled by a control signal which is supplied by the controller CPU 33 through the controller bus 21. The photographing unit 24 includes a solid-state image pickup device such as a CCD and a camera signal processing circuit. A digital video signal from the photographing unit 24 is written onto a buffer memory 26 through an interface 25 complying with the IEEE (Institute of Electrical and Electronics Engineers) 1394 Standard.

The output data of the buffer memory 26 is fed to a JPEG encoder and metadata attacher 27. The JPEG encoder and metadata attacher 27 converts picture data into JPEG data. The JPEG defines one method of data compression. The picture data may be compressed using another method or may not be compressed.

The camera unit 3 includes a GPS (Global Positioning System) receiver 28 to acquire a position fix. With the GPS receiver 28, the position data of the camera unit 3 is stored, and the direction of the camera is detected. The directions of a plurality of cameras are thus controlled in an interlocking motion. The GPS receiver 28 is controlled by a control signal which is supplied by the controller CPU 33 through the controller bus 21.

The output signal of the GPS receiver 28 is fed to a metadata generator 29. The metadata generator 29 generates position information (information such as latitude and longitude, bearing, and altitude) based on the position fix provided by the GPS receiver 28, and metadata (time and parameters of the camera section 5 such as magnification, focus value, and iris value). The position information and metadata are fed to the JPEG encoder and metadata attacher 27. The JPEG encoder and metadata attacher 27 attaches the position information and metadata to the JPEG data.

The JPEG data, and the position information and metadata attached thereto are stored in a main memory 30 such as a hard disk, while being supplied to a graphic controller 31 and image compressor 32 at the same time. In this specification, the accumulation of data in the main memory 30 is referred to as "recording", and the reading of data from the main memory 30 is referred to as "reproduction". Also in this specification, an operation in which a picture currently being photographed is displayed without being stored in the main memory 30 is referred to as a live mode, and an operation in which data stored in the main memory 30 is reproduced and displayed is referred to as a view mode.

The main memory 30 has a function as a server. For example, the amount of data of a single frame as a result of compressing an XGA picture becomes about 100 Kbytes, and a picture of 128 frames becomes 12.5 Mbytes. If the main memory 30 has a capacity of 80 Gbytes, it can hold JPEG data for full one day long recording. The view mode enables the reproduction of not only data stored in the main memory 30 but also older data stored in a storage device such as an archive.

The JPEG data read from the main memory 30 is then supplied to the graphic controller 31. The image compressor 32 generates a compressed picture or a thumbnail from one of the JPEG data from the JPEG encoder and metadata attacher 27 and the JPEG data read from the main memory 30. For example, by decimating the pixels in a vertical direction and in a horizontal direction, a whole panorama picture is generated. The image compressor 32 also performs a compression process to form a coverage area picture to be discussed later. In the case of the XGA picture, a whole panorama picture of 400×1000 pixels is produced when the data of about 100 million pixels is JPEG compressed and then processed by the image compressor 32 JPEG. The coverage area picture is a thumbnail, and is an image even coarser than the whole panorama picture.

The graphic controller 31 performs a graphic process to convert the JPEG data into bitmap data and to present a desired display on the screen of the display 2. Specifically, GUI displays such as a coverage area picture display, whole picture display, selected picture display, and buttons are presented on the screen of the display 2. The detail of the display will be discussed later.

The graphic controller 31 performs image processing, thereby detecting a change in the picture. A change in the picture is the one that occurs with respect to a reference picture. For example, in the view mode, a current picture is compared with the reference picture stored before, and a change in the picture is detected. A picture at a predetermined time on the preceding day is set as a reference picture, and a picture difference between the reference picture and the picture stored subsequent to that point of time is detected. If the absolute value of the picture difference becomes equal to or rises above a predetermined value, the change is accepted as a picture change. In one method of detecting a difference, a difference between the pixels at the same spatial position from the reference picture to the picture to be compared is detected. Instead of detecting difference for all pixels, representative pixels or remaining pixels subsequent to decimation may be subjected to difference calculation. The difference calculation may be performed for a particular color to detect a change in an object having the predetermined color.

If a change is detected, a display alarm is provided on the screen of the display 2, thereby distinguishing from the remaining frames the one which has the change. Specifically, the display alarm is provided using a luminance change, color change, or display blinking. Any predetermined picture may be selected from among stored pictures as the reference picture.

As discussed above, the controller CPU 33 connected to the controller bus 21 performs lens control of the camera section 5 (for focusing, for example), exposure control (for stop, gain, and electronic shutter speed, for example), white balance control, and image quality control, while also controlling the pan part 4*a* and tilt part 4*b*.

An I/O (input/output) port 34 connects to a keyboard 35 and mouse 36. A memory card 37 and clock 38 are respectively connected to the I/O port 34. The JPEG data, and the position information and metadata attached thereto, stored in the main memory 30, are written onto the memory card 37. Time data is acquired from the clock 38.

FIG. 2 shows units connected to the controller bus 21. The camera unit 3 may be installed at a location remote from the computer 1, and both units may be connected through an IEEE1394 or USB interface. In this case, an optical fiber may serve as a physical transmission line. The use of the optical fiber allows the camera unit 3 to be installed several hundred meters to several kilometers away from the computer 1. Furthermore, the two units may be interconnected using a radio LAN (Local Area Network).

Figure 3:
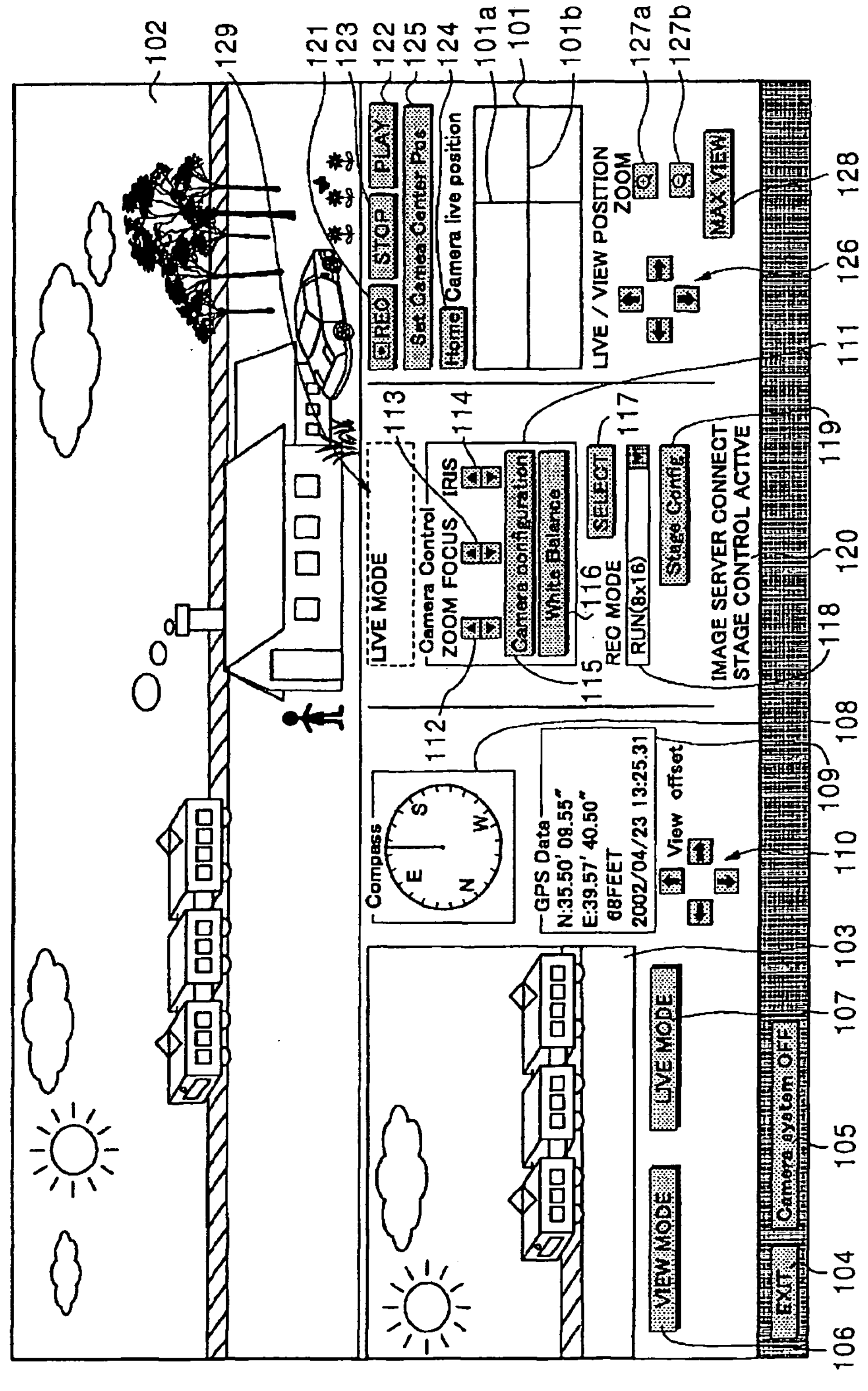
FIG. 3 diagrammatically illustrates a display screen in accordance with the embodiment of the present invention.

FIG. 3 diagrammatically illustrates a GUI display screen in accordance with the embodiment of the present invention. Operation buttons and display regions provided on the GUI screen are discussed. One single screen includes a coverage area picture display 101, whole picture display 102, and selected picture display 103.

The coverage area picture display 101 presents a coverage area picture. The coverage area picture is a picture which is photographed by the camera unit 3 in the maximum photographing area thereof, and is composed of a plurality of frames. As already discussed, the maximum pan angle is 180°, and the maximum tilt angle is 50°. The coverage area picture is formed of a plurality of frames photographed in these maximum ranges. For example, the camera unit 3 is mounted, and the camera section 5 is moved with the optical axis thereof shifted within the maximum ranges. A picture is formed of a plurality of frames obtained as a result. The pixels forming the picture are then decimated in vertical and horizontal directions to be thumbnail. The resulting thumbnail is the coverage area picture.

The coverage area picture display 101 indicates a current position of the lens optical axis of the camera unit 3 (camera live position) at an intersection of a line segment 101*a* and line segment 101*b*. By moving the line segments 101*a* and 101*b*, a desired position is designated within the coverage area picture, and a picture photographing direction is thus controlled to direct to the designated position. With the designated position being set as a center or home position, M×N still frame pictures are photographed within the predetermined ranges, and stored, or displayed. The present invention is not limited to the line segments 101*a* and 101*b*. Alternatively, a pointer or mouse 36 may point to any position on the screen presented on the coverage area picture display 101, and the camera unit 3 may be controlled so that the lens optical axis of the camera unit 3 is directed to the designated position.

The whole picture display 102 presents a whole panorama picture. The whole panorama picture is the one into which the image compressor 32 compresses the JPEG data corresponding to a source picture photographed. A monitoring operation is performed watching the displayed whole panorama picture. As already discussed, if a picture change is detected, the system provides an alarm display in which a frame within which the change is detected is displayed in a manner different from the remaining frames in the whole picture presented on the whole picture display 102.

The selected picture display 103 presents a selected picture. The selected picture is an expanded image of a portion of the whole panorama picture. An expanded image is presented by displaying an uncompressed source frame image. The image is further expanded using digital signal processing.

An EXIT button 104 is used to cut off power to the monitoring system. A camera system OFF button 105 is used to cut off power to the camera unit 3.

A VIEW MODE button 106 is used to switch the mode of the monitoring system to a view mode. During the vide mode, the whole picture and partial picture are displayed based on the picture data stored in the main memory 30 or in another server.

A LIVE MODE button 107 is used to switch the mode of the monitoring system to the live mode. During the live mode, the whole picture and partial picture are displayed based on the frames currently being photographed by the camera unit 3.

A compass display region 108 is used to display a bearing to which the optical axis of the lens of the camera is directed. A GPS data display region 109 displays the latitude, longitude, and altitude where the camera unit 3 is installed, and date and time at which the photographing operation is performed. Data shown on the regions 108 and 109 is the one that is acquired by the GPS receiver 28 in the camera unit 3 in the position fixing operation thereof. A view offset button 110 is used to adjust the position of a selected frame. The view offset button 110 moves the single frame, selected by a pointer in the whole picture presented by the whole picture display 102, upward, downward, to the left or to the right. A plurality of frames forming the whole picture are linked together with one frame overlapping the next by a predetermined number of pixels, 16 pixels, for example. By moving each frame within the overlap coverage, adjacent frame alignment is assured. The linking condition between the adjacent frames is thus smoothed.

A mode display region 129 is used to display mode information, alarm information, error information, etc. The mode information informs the user of the mode of the monitoring system, and specifically, the mode information indicates the live mode or the view mode. The alarm information alerts the user and, for example, the alarm information is provided when the frame reaches a limit with the view offset button 110 being pressed. The error information informs the user of an error occurring in the monitoring system.

A camera control region 111 includes a ZOOM button 112, FOCUS button 113, IRIS button 114, camera configuration button 115, and white balance button 116. The ZOOM button 112 adjusts the zoom of the camera unit 3. The FOCUS button 113 adjusts the focus of the camera unit 3. The IRIS button 114 adjusts the iris of the camera unit 3. The camera configuration button 115 adjusts γ characteristics, shutter speed, and gain of the camera unit 3. The white balance button 116 adjusts the white balance of the camera unit 3. While the monitoring system is in the view mode, the display of the camera control region 111 may be omitted.

A SELECT button 117 is used to display a select display in the view mode. The select display is used to identify an area, desired to be reproduced or stored, by a frame constituting the whole picture.

Figure 4:
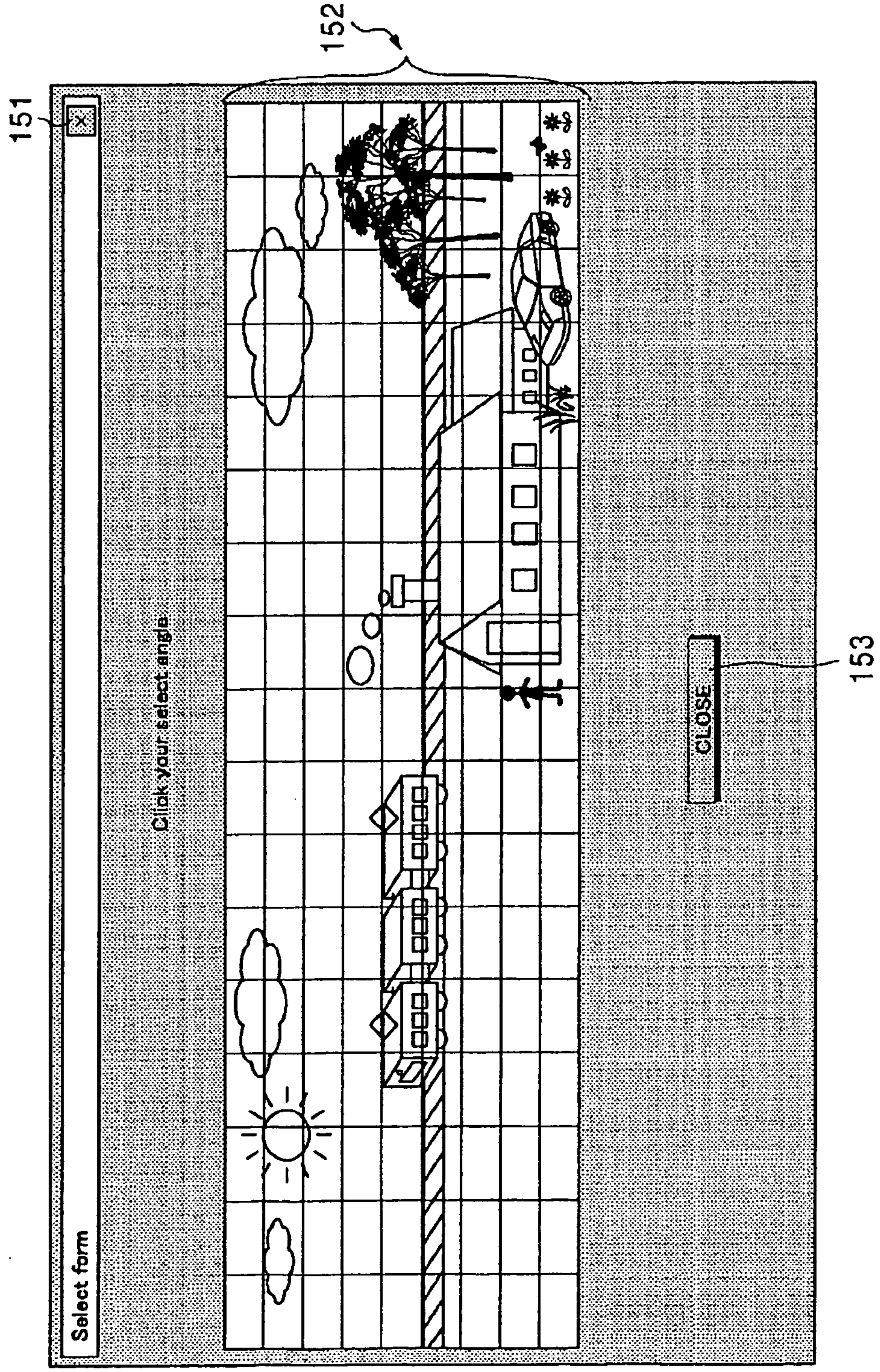
FIG. 4 diagrammatically illustrates a select display screen in accordance with the embodiment of the present invention.

FIG. 4 diagrammatically illustrates a select display screen in accordance with the embodiment of the present invention. As shown, the select display includes a closing button 151, display screen 152, and closing button 153. The close buttons 151 and 153 are clicked to close the select display. The display screen 152 presents a whole picture presented on the whole picture display 102, and indicates an outline of a frame to be captured. The whole picture displayed on the whole picture display 102 may be partitioned according to unit of frames to be captured, and may then be displayed on the display screen 152. A grid of lines may be superimposed on the whole picture. If the pointer is pointed to any position on a desired picture, the frame indicated by that point is selected, and one of the brightness, resolution, and contrast of the indicated frame varies to show that the frame is selected.

A REC MODE selection menu 118 is a pull-down menu to select a recording mode. The pull-down menu displays a recording mode which represents a combination of a picture size to be recorded and recording method (RUN or SINGLE). The picture size can be any of a whole picture formed of 8×16 frames, a partial picture formed of selected 4×8 frames of the whole picture, and a partial pictured formed of selected 2×4 frames of the whole picture. The partial picture is the one at a position selected on the select display. The RUN recording method is used to record the photographed picture generated every predetermined period of time (every five seconds, for example), and the SINGLE recording method is used to record the photographed picture once. The recording mode is used to select a combination of the RUN recording method and SINGLE recording method.

A stage configuration button 119 is a fine adjustment button to adjust the accuracy with which a stage of the camera unit 3 is moved. A message region 120 is used to display a connection status between the control computer 1 and camera unit 3, and a control status of the stage of the camera unit 3. If the control computer 1 is connected to the camera unit 3, a message reading "IMAGE SERVER CONNECT" is posted on the message region 120 as shown in FIG. 3. When the stage of the camera unit 3 is in a controllable state, a message reading "STAGE CONTROL ACTIVE" is posted on the message region 120.

A REC button 121 starts the recording of the picture. If the REC button 121 is designated by the pointer, the recording corresponding to the recording mode selected in the REC MODE selection menu 118 starts. Specifically, the recording corresponding to a mode selected from among the modes RUN (8×16), RUN (4×8), RUN (2×4), SELECT SINGLE RUN (8×16), SELECT SINGLE RUN (4×8), SELECT SINGLE RUN (2×4), etc. starts.

A PLAY button 122 is used to reproduce the picture data stored in the server (main memory 30). Specifically, if the PLAY button 122 is designated, a recorded data display screen is presented. Information to identify stored picture data appears on the recorded data display screen. The information is based on information described in a direction file to be discussed later.

Figure 5:
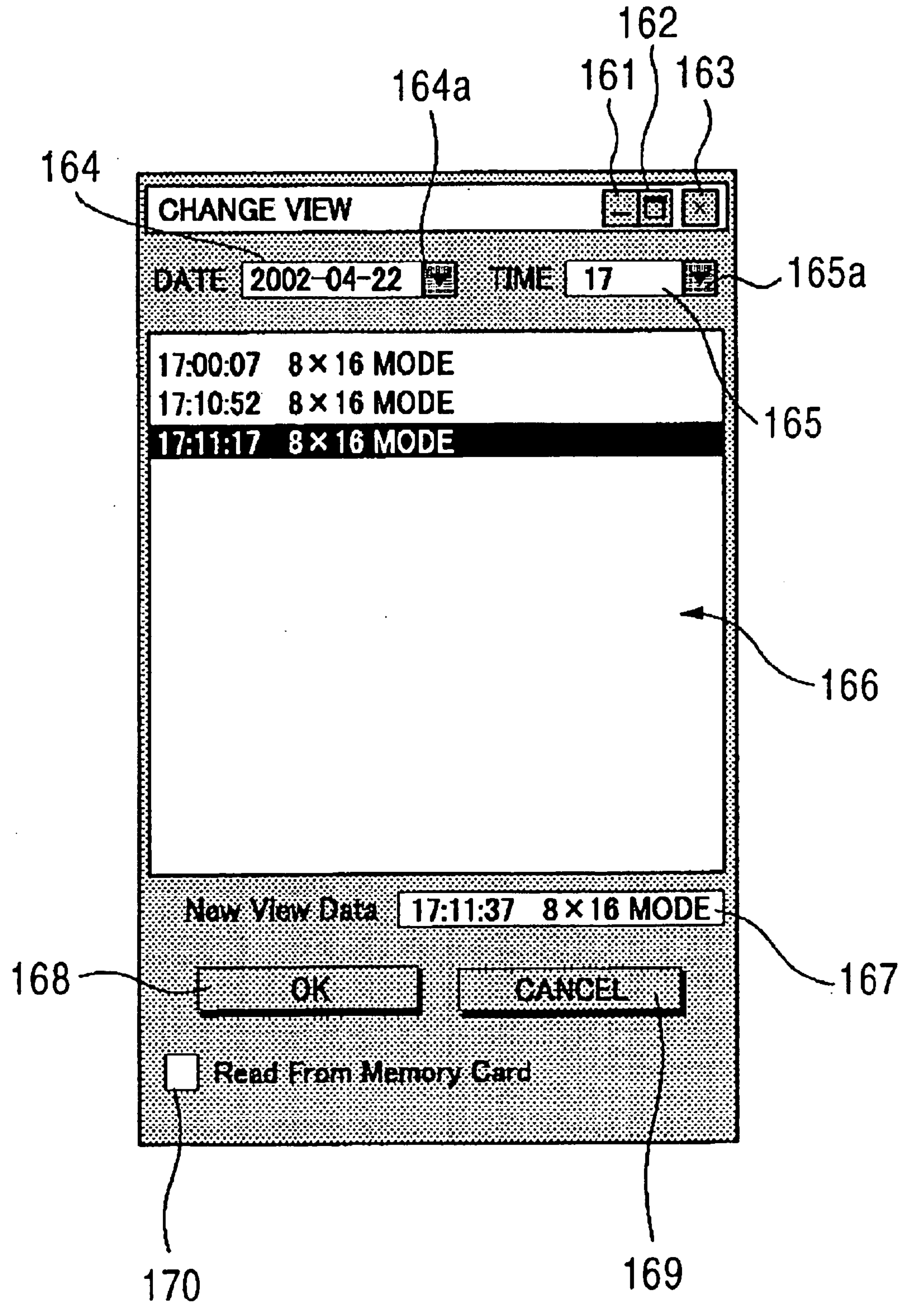
FIG. 5 diagrammatically illustrates a recorded data display screen which is reproduced in accordance with the embodiment of the present invention.

FIG. 5 illustrates one example of the recorded data display screen. Shown on the recorded data display screen are a minimizing button 161, maximizing button 162, closing button 163, date box 164, time box 165, recorded data display area 166, updated data display area 167, OK button 168, cancel button 169, and storage device switching button 170.

The minimizing button 161 is clicked to minimize the size of the recorded data display screen to icons. The maximizing button 162 is clicked to maximize the size of the recorded data display screen over the full screen of the monitor. The closing button 163 is clicked to close the recorded data display screen.

The date box 164 is used to designate the date of the recorded data to be displayed on the whole picture display 102. For example, click a button 164*a* arranged on the right hand end of the date box 164, and a list of the dates of displayable recorded data appears in a pull-down menu form. Date is selected from among the listed dates.

The time box 165 is used to designate the time of the recorded data to be displayed on the whole picture display 102. For example, click a button 165*a* arranged on the right hand end of the time box 165, and a list of the times of displayable recorded data appears in a pull-down menu form. Time is selected from among the listed times.

The recorded data display area 166 shows, from the storage device, recorded data matching the date and time designated by the date box 164 and time box 165. The updated data display area 167 shows latest recorded data from the recorded data stored in the storage device. Alternatively, the latest recorded data from among the recorded data designated by the date box 164 and time box may be displayed.

The OK button 168 is clicked subsequent to the designation of the desired recorded data. The cancel button 169 is clicked to close the recorded data display screen. The storage device switching button 170 is used to enter a check mark to switch the destination of data storage from the storage device to a detachable semiconductor memory card, for example.

Returning to FIG. 3, a STOP button 123 is used to stop the recording or reproduction of the data. The STOP button may be presented subsequent to the designation of the REC button 121 or the PLAY button 122 by the pointer.

A set camera center POSITION button 124 is used to designate the direction of the camera as the center of the picture (8×16 frames).

A HOME button 125 is used to control the camera unit 3 to direct the optical axis of the lens of the camera unit 3 to a home position. The home position refers to a position where the camera is directed to the leftmost position. A LIVE/VIEW POSITION button 126 is used to pan or tilt the camera.

ZOOM buttons 127A and 127B are used to zoom out and in the selected picture displayed on the selected picture display 103.

A MAX VIEW button 128 is used to expand and display the selected picture on a different display such as the whole picture display 102.

Figure 6:
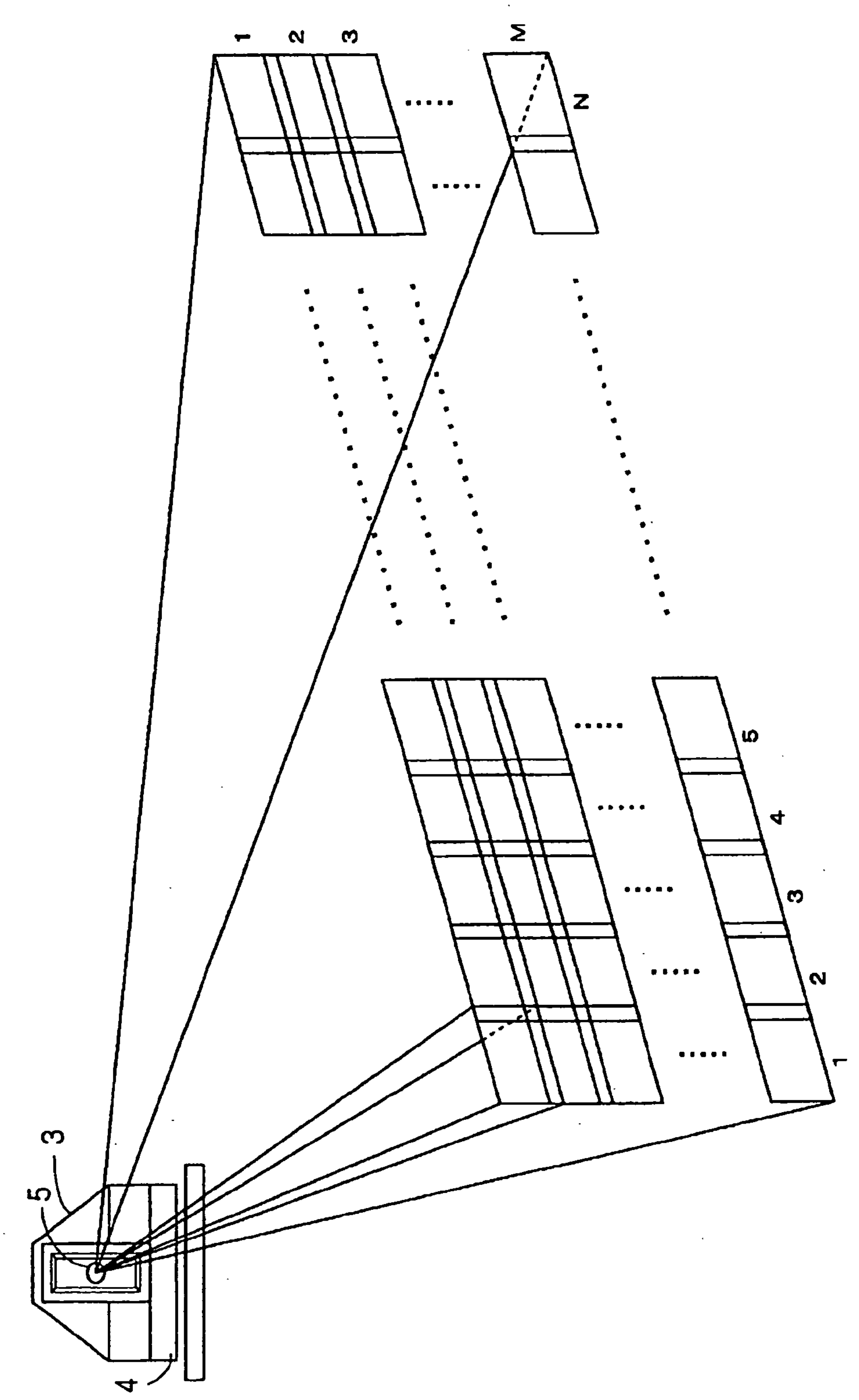
FIG. 6 diagrammatically illustrates photographing and picture capturing operations in accordance with the embodiment of the present invention.

A production method of the whole picture in accordance with the embodiment of the present invention will be discussed with reference to FIG. 6. As shown, the camera section 5 is mounted on the panhead of the pan and tilt section 4 in the camera unit 3, and the photographing direction is varied from the home position of the camera. When viewed from the camera side, photographed frames of M rows and N columns are successively numbered. Specifically, the rows from top to bottom are respectively numbered with 1, 2, . . . , M, and the columns from right to left are respectively numbered with 1, 2, . . . , N. The home position is a position where the frame at coordinates (1,1) is photographed.

If the frame at coordinates (1,1) is photographed, the camera unit 3 is tilted downward to photograph the frame at coordinates (2,1). In succession, the frame (3,1), . . . , (M,1) are successively photographed. Next, the frame at the top row and second column at coordinates (1,2) is photographed. The photographing operation continues until the frame at coordinates (M,N) is photographed. As already described, there is an overlap coverage of 16 pixels between one frame and a next frame adjacent thereto. The photographed frame is JPEG compressed, and stored in the main memory 30.

In the case of the XGA picture (having 1024×768 pixels), the total of 128 frames form a picture of about 100 million pixels (1024×16 (=16,384) pixels in a horizontal direction and 768×8 (=6,144) pixels in a vertical direction), if an overlapping coverage is disregarded. The whole picture display 102 shows a compressed picture or a thumbnail picture formed of that picture. The selected picture display 103 shows an XGA picture of one frame, for example. The selected picture display 103 thus presents an extremely high resolution picture. An unclear image, if displayed on the whole picture, becomes clear on the selected picture.

Figure 7:
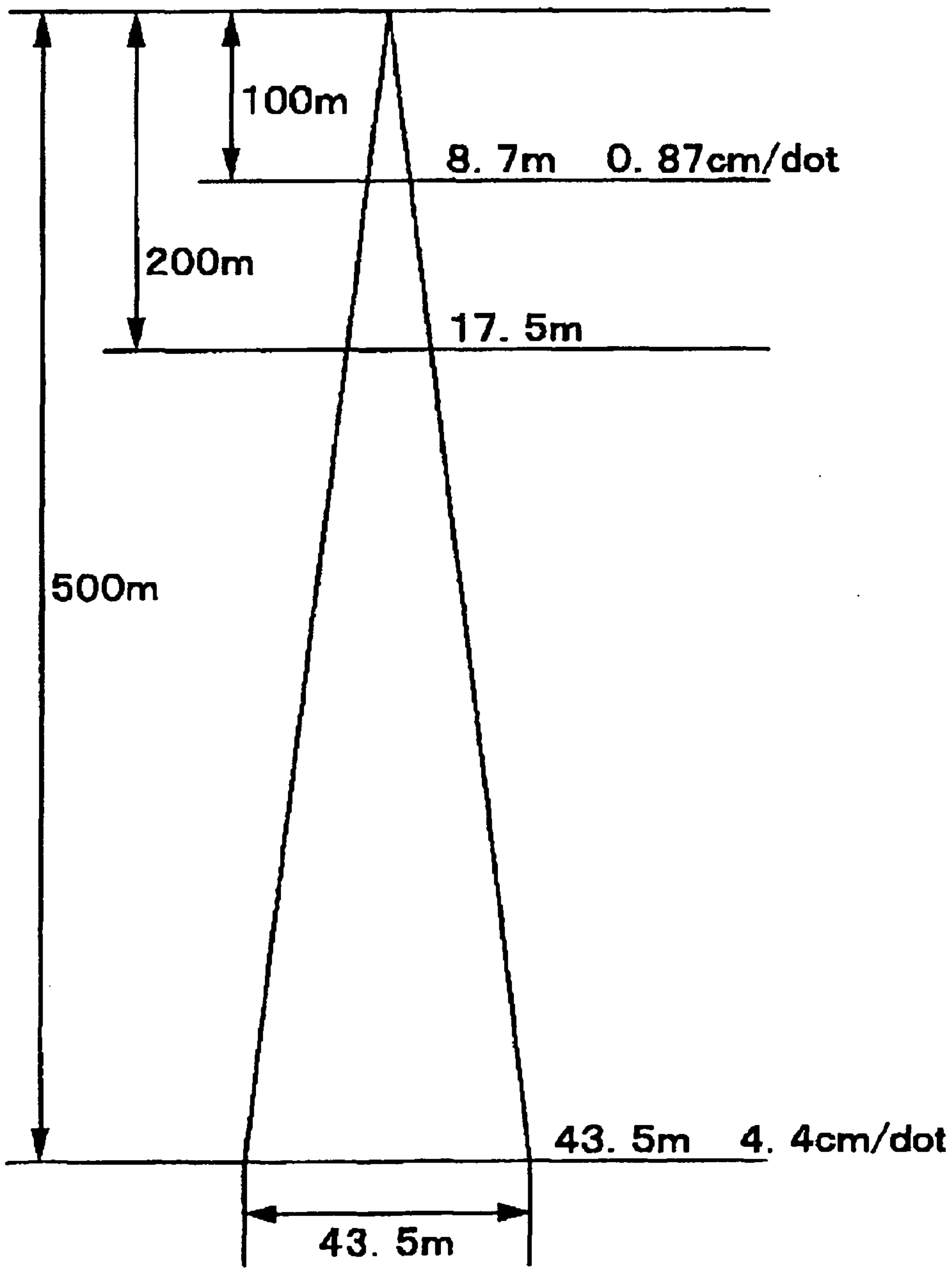
FIG. 7 is a diagram illustrating a range to an object, photographing area, and resolution in accordance with the embodiment of the present invention.

FIG. 7 is a diagram illustrating an angle of view of one frame when the camera unit 3 having a telephoto lens of a magnification of 75 is photographing. If an object is spaced away from the camera unit 3 by 100 m, the one frame covers an area of a vertical dimension of 8.7 m by a horizontal dimension of 1.17 m. For example, if the image pickup device of the camera section 5 uses an XGA format, a single pixel covers an area of a vertical dimension of 0.87 cm by a horizontal dimension of 1.17 cm of the object.

If the object is spaced away from the camera unit 3 by 200 m, the one frame covers an area of a vertical dimension of 1.74 m by a horizontal dimension of 2.34 m. For example, if the image pickup device of the camera section 5 uses an XGA format, a single pixel covers an area of a vertical dimension of 1.74 cm by a horizontal dimension of 2.34 cm of the object.

If the object is spaced away from the camera unit 3 by 500 m, the one frame covers an area of a vertical dimension of 4.36 m by a horizontal dimension of 5.84 m. For example, if the image pickup device of the camera section 5 uses an XGA format, a single pixel covers an area of a vertical dimension of 4.36 cm by a horizontal dimension of 5.84 cm of the object.

Figure 8A:
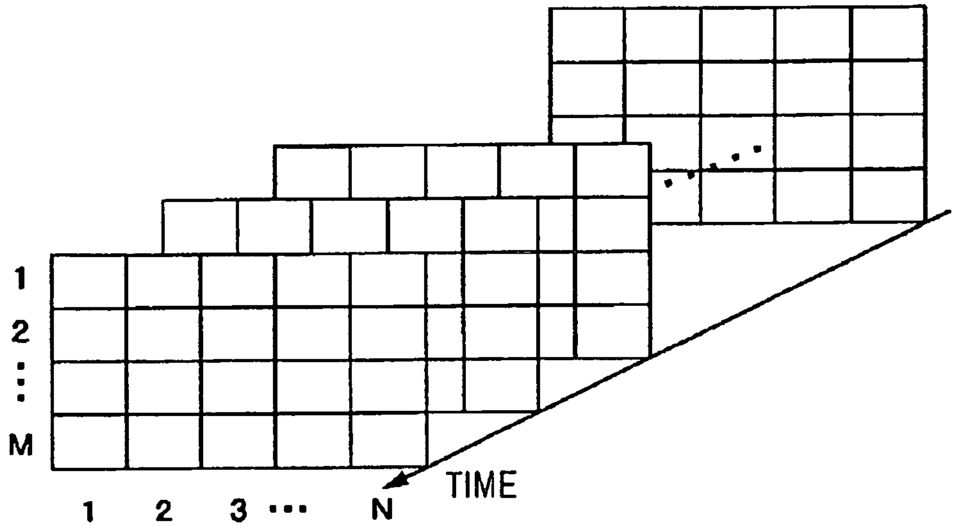
FIGS. 8A and 8B illustrate a management method of photographed pictures.

A data management method of the captured picture data stored in the archive 10 or the main memory 30 is discussed below with reference to FIGS. 8A and 8B. As already discussed, at every predetermined intervals, the M×N frames of picture are photographed, compressed, and then stored. As shown in FIG. 8A, the position of each frame is defined by one of the M rows and one of N columns. For example, a position address (1,1) defines the topmost and rightmost frame. Each frame has a filename of a position address and information about time of recording. The time information is composed of the year, month, day, hour, minute, and second. The filename of each frame includes the year, month, day, hour, minute, and second, and the position address.

Figure 8B:
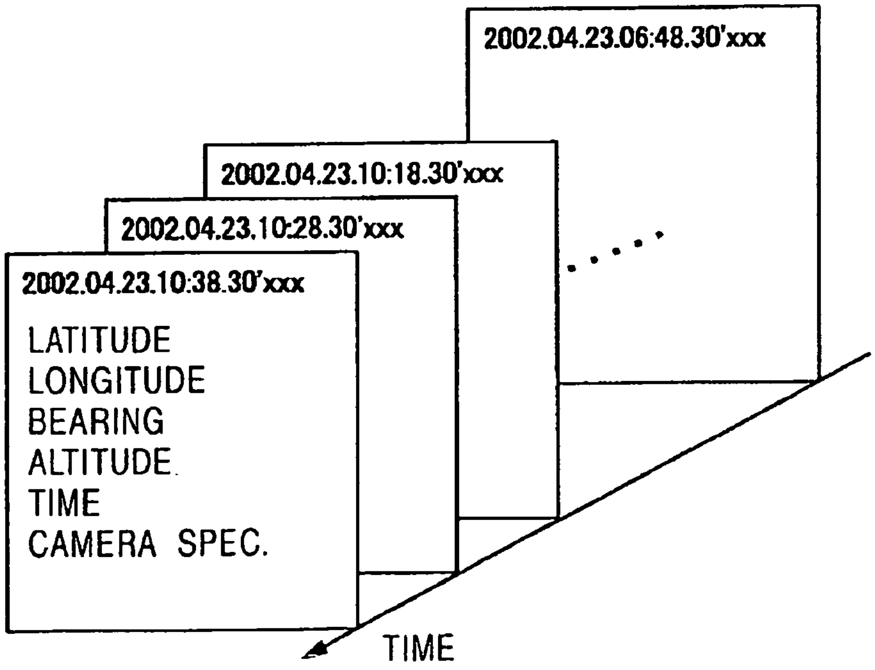

As shown in FIG. 8B, a direction file is created when the M×N frames form a single whole picture. The direction file defines a set of M×N frames by including the same data as filename (the year, month, day, hour, minute, and second, and the position address) of a frame having the position address (1,1). The direction file contains the position information and metadata of the set of frames. The position information and metadata are generated by the metadata generator 29. Specifically, the position information (information such as latitude and longitude, bearing, and altitude), and metadata information (time and parameters of the camera section 5 such as magnification, focus value, and iris value).

Figure 9:
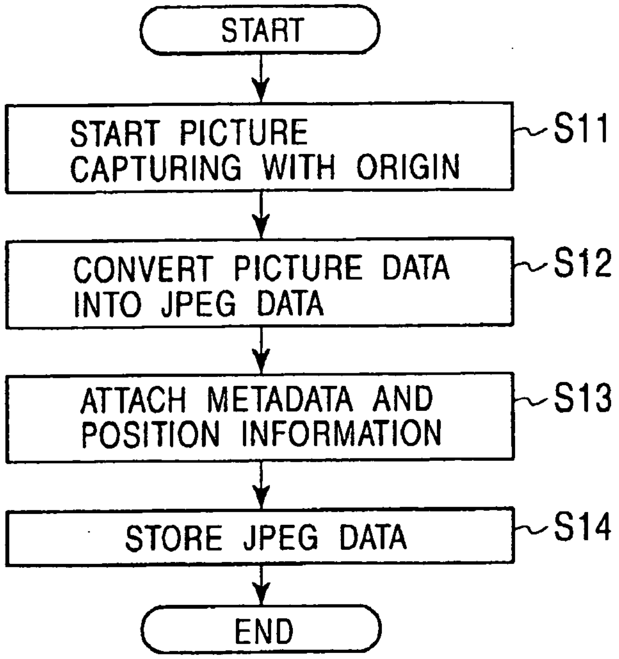
FIG. 9 is a flow diagram illustrating a capturing operation of a coverage area picture in accordance with the embodiment of the present invention.

The process of capturing and displaying the coverage area picture on the coverage area picture display 101 will be discussed. With reference to a flow diagram shown in FIG. 9, the picture data is captured into the main memory 30 under the control of the controller CPU 33. When the camera unit 3 is installed at a predetermined place, the pictures are captured. To start this process, a start command is input using a setting menu screen (not shown). The coverage area picture is captured at any time such as at an initial setting.

In step S11, a photographing operation starts at the origin. The origin is at the end of the coverage area or at the center of the coverage area. With the pan part 4*a* and tilt part 4*b* in the camera unit 3 controlled, the optical axis of the lens of the camera unit 3 is aligned with the photographing direction of the (still) frame at the origin. When one frame is photographed at the origin, the tilt angle and photographing direction are varied to photograph a next frame. Frames are thus photographed one after another. The photographing direction of the camera is varied within the maximum pan angle and the maximum tilt angle.

In step S12, the captured still frame pictures are converted into JPEG data by the JPEG encoder and metadata attacher 27. In step S13, the metadata and position information are attached to the JPEG data. The metadata includes the time information, latitude and longitude, etc., produced by the metadata generator 29, and the position information is the position address of each frame.

In step S14, the JPEG data, and the metadata and position data attached thereto are stored onto the main memory 30. With the camera panned and tilted within the maximum range, a number of frames are acquired within the maximum range. All frames within the coverage area are thus captured, and converted to the JPEG data. The JPEG data, and the metadata and position information attached thereto are stored into the main memory 30. The capturing process of the picture image is thus completed. Since the coverage area picture serves as a guide to determining the photographing direction, a compressed picture or a thumbnail may be stored in the main memory 30 rather than storing the source picture.

Figure 10:
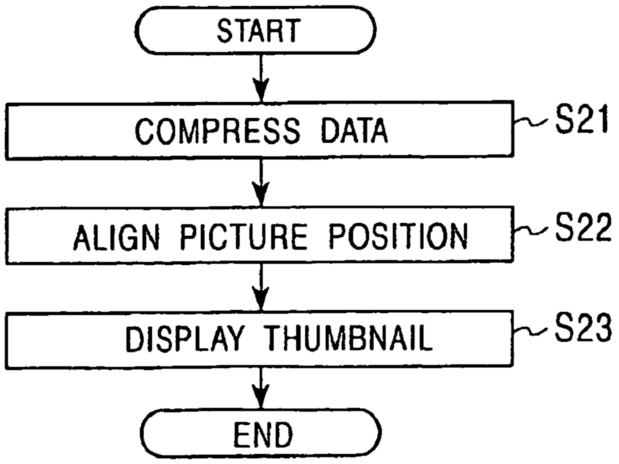
FIG. 10 is a flow diagram illustrating a displaying operation of the coverage area picture in accordance with the embodiment of the present invention.

The display process of the stored pictures on the coverage area picture display 101 in the display 2 is discussed below with reference to a flow diagram shown in FIG. 10. The display process is carried by the main memory 30, graphic controller 31, image compressor 32 and other blocks. In step S21, picture data retrieved from the main memory 30 is reproduced, and is then subjected to data compression such as data decimation. The coverage area picture as the thumbnail is thus generated. In step S22, the coverage area picture is aligned in position to be presented on the coverage area picture display 101. In step S23, the thumbnail, namely, the coverage area picture is displayed.

Figure 11:
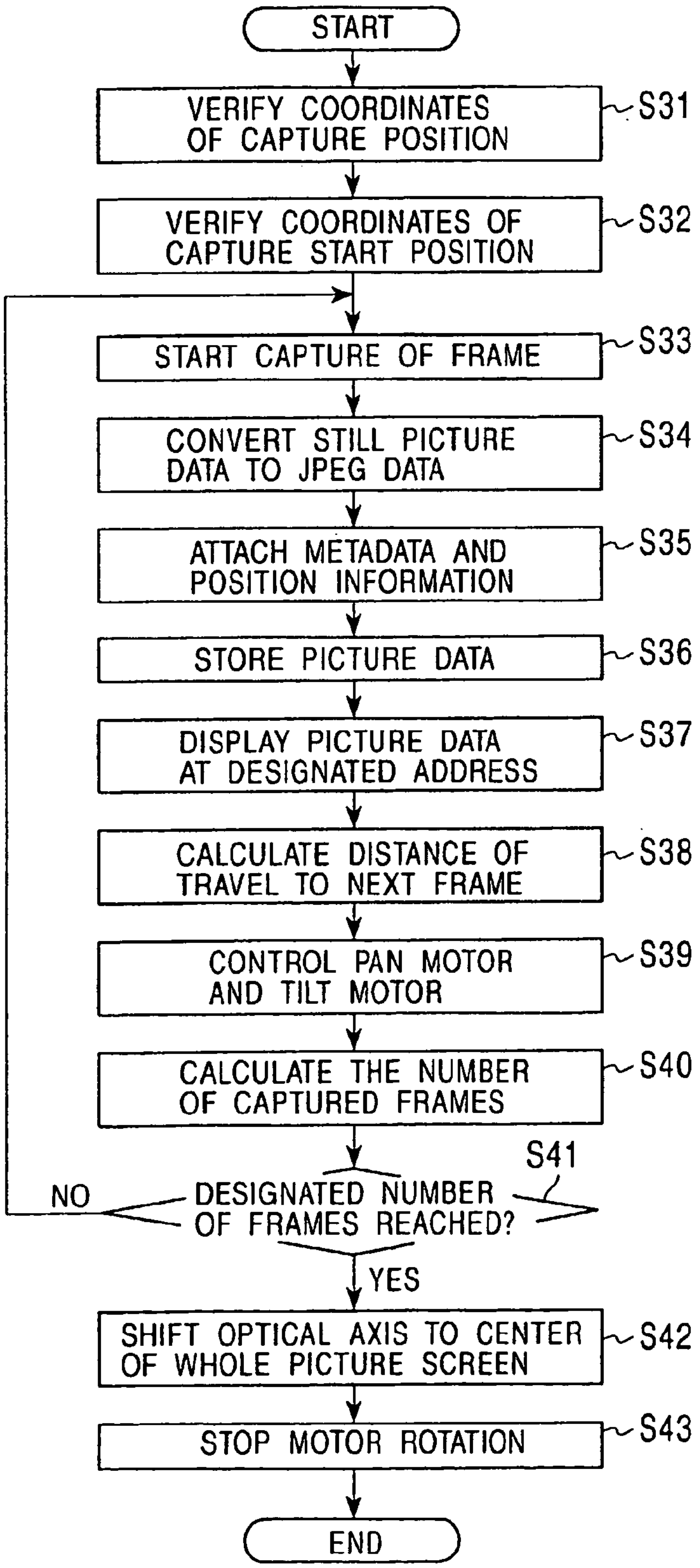
FIG. 11 is a flow diagram illustrating a capturing operation of the coverage area picture in accordance with the embodiment of the present invention.

The process of displaying the whole picture on the whole picture display 102 is discussed with reference to FIG. 11. The displaying process is mainly carried out by the graphic controller 31. When an arbitrary point or area within the coverage area picture shown in the above-referenced coverage area picture display 101 is indicated by a pointer, a control algorithm illustrated in the flow diagram shown in FIG. 11 is invoked.

In step S31, the capture position within the coverage area picture is designated by the pointer, and the capture coordinates of the whole picture are verified. For example, the capture position is designated by moving the line segments 101*a* and 101*b* shown on the coverage area picture display 101. Alternatively, the capture position may be designated by moving a cursor with a mouse. In step S32, a start position of the whole picture is calculated. Based on the result of calculation, the pan part 4*a* and tilt part 4*b* in the camera unit 3 are controlled. The lens optical axis of the camera unit 3 is shifted to the capture start position, for example, to a frame at a predetermined position from among the set of M×N frames.

In step S33, a still picture photographed by the photographing unit 24 is captured as a first frame. In step S34, the still picture data is converted into JPEG data. In step S35, the metadata and position information are attached to the JPEG data. The conversion of the picture data into the JPEG data and attachment of the metadata and position information to the JPEG data are performed by the JPEG encoder and metadata attacher 27.

In step S36, the JPEG data, and the metadata and position information attached thereto are recorded onto the main memory 30. In step S37, data reproduced from the main memory 30 is displayed at a designated address in the whole picture display 102 on the display 2 under the control of the graphic controller 31.

In step S38, a distance to a photographing position of a next frame is calculated. In step S39, the pan part 4*a* and tilt part 4*b* are controlled in response to the distance calculated in step S38. The photographing position is set to the photographing start position of the next frame.

In step S40, the number of already captured frames is calculated. It is determined in step S41 whether the M×N frames are captured. As already discussed, if a predetermined number of frames, for example, 2×4 frames, or 4×8 frames is set within the M×N frames, for example, 8×16, it is determined whether the predetermined number of frames is captured.

If it is determined in step S41 that the number of already captured frames has reached the designated number of frames, the algorithm proceeds to step S42. The lens optical axis of the camera unit 3 is shifted to the center of the whole picture display 102. If it is determined in step S41 that the number of already captured frames has not yet reached the designated number of frames, the algorithm loops to step S33 to start over with the capturing of a next frame.

The process steps (steps S38 and S39) required to move the photographing position to capture the next frame may be carried out only when it is determined that the number of captured frames has not yet reached the designated number.

Figure 12:
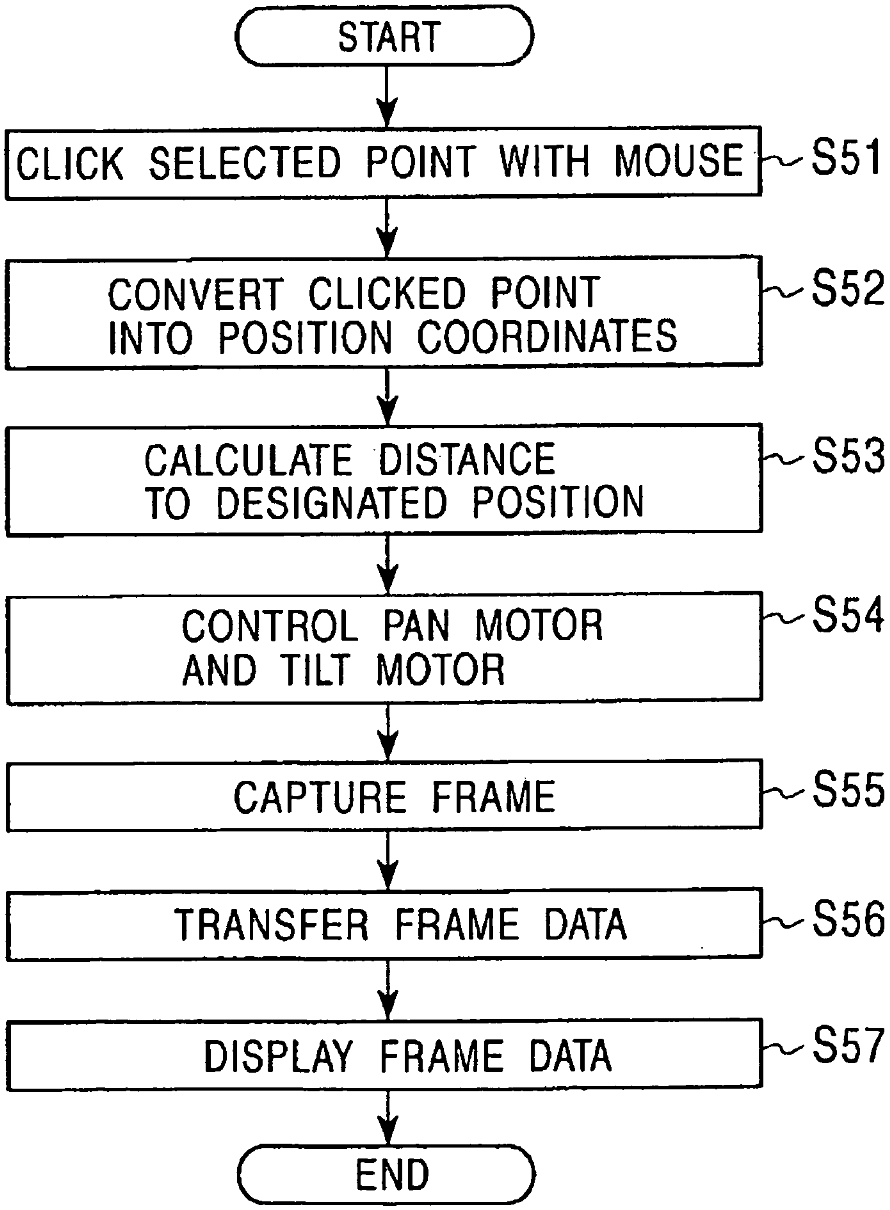
FIG. 12 is a flow diagram illustrating a capturing operation and displaying operation of a selected picture in accordance with the embodiment of the present invention.

When any arbitrary point or area within the coverage area picture is designated by the pointer, the M×N frames with respect to the designated position are captured and the whole picture is then displayed. The picture at a point or area designated within the whole picture is presented on the selected picture display 103 as a selected picture. The process of capturing and displaying the selected picture is carried out by the graphic controller 31 and controller CPU 33 in accordance with a flow diagram shown in FIG. 12.

In step S51, the cursor is moved to a select point on the whole picture, and the mouse is clicked. In step S52, the clicked point is converted into position coordinates. The position coordinates are defined for the photographing area composed of the M×N frames. In step S53, the distance from the current photographing position to the designated position is calculated.

In step S54, the pan part 4*a* and tilt part 4*b* are controlled to move the photographing position by the calculated distance. In step S55, a frame is photographed at that position. In step S56, frame data is transferred to the JPEG encoder and metadata attacher 27. The frame captured by the graphic controller 31 is then presented on the selected picture display 103 as a selected picture. The selected picture has the number of pixels defined by the XGA format, and is based on uncompressed data. The selected picture, having a resolution higher than the whole picture, is clear. Since the selected picture has a size larger than one frame within the whole picture, the selected picture display 103 thus presents an expanded picture.

The present invention is not limited to the above-referenced embodiment, and changes and modifications are possible without departing from the scope of the present invention. For example, the maximum pan range is 180° in the above-referenced embodiment. The maximum pan range may be 360°. The number of coverage area pictures is not limited to one. A plurality of coverage area pictures are acceptable.

Figure 13:
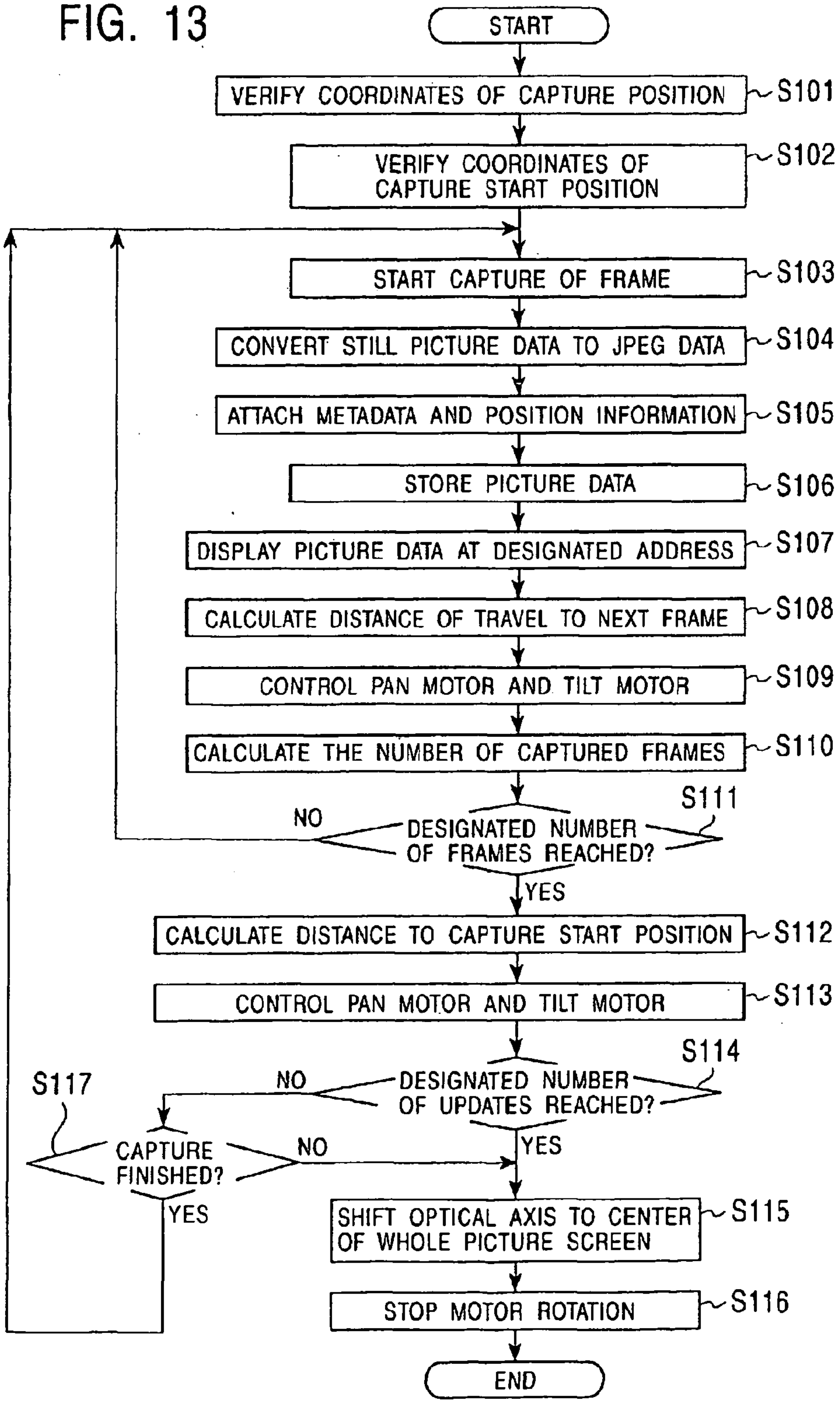
FIG. 13 is a flow diagram illustrating a capturing operation of a frame of a whole picture in accordance with the embodiment of the present invention.

The frame capturing operation of the whole picture in the whole picture display 102 will be discussed now. FIG. 13 is a flow diagram illustrating a frame capturing operation of a frame of the whole picture in accordance with the embodiment of the present invention. If the LIVE MODE button 107 is designated by the pointer, and if the REC button 121 is designated by the pointer, a control algorithm represented by the flow diagram is invoked.

When the capture position on the coverage area picture presented on the coverage area picture display 101 is designated by the pointer in step S101, the location of the whole picture with respect to the coverage area picture is determined. The capture coordinates of the whole picture are thus verified.

In step S102, the capture start position of the whole picture is calculated. Based on the result of calculation, the pan part 4*a* and tilt part 4*b* in the camera unit 3 are controlled to move the lens optical axis of the camera unit 3 to the capture start position. The capture start position is the center position of the frame captured first.

In step S103, the lens unit 22, focus-zoom-iris controller 23, and photographing unit 24 in the camera unit 3 are controlled to capture the frames and to feed the captured frames to the control computer 1 as the picture data.

In step S104, the picture data supplied from the camera unit 3 is converted into predetermined picture format data such as JPEG data.

In step S105, the metadata and position information are attached to the predetermined picture format data.

In step S106, the picture data, and the metadata and position information attached thereto are stored in the main memory 30.

In step S107, the picture data in the predetermined picture format is displayed at the designated address, for example, at (0,0) in the whole picture display 102.

In step S108, the distance of the lens optical axis of the camera unit 3 to a next frame is calculated.

In step S109, the pan part 4*a* and tilt part 4*b* are controlled in accordance with the distance calculated in step S108, thereby directing the lens optical axis of the camera unit 3 to the center of the next frame.

In step S110, the number of captured frames is calculated. For example, a count of a counter may be incremented by one each time one frame is captured. The number of frames is thus counted.

In step S111, it is determined whether the counted number of captured frames has reached the designated number of frames. If it is determined that the number of captured frames has reached the designated number of frames, the algorithm proceeds to step S112; otherwise, the algorithm loops to step S103. The designated number of frames is precalculated in accordance with the mode selected in the REC MODE selection menu 118. Specifically, if the RUN (8×16) mode is selected, the number of frames is 128. If the RUN (4×8) is selected, the number of frames is 32. If the RUN (2×4) is selected, the number of frames is 8.

In step S112, the distance between the current position of the lens optical axis of the camera unit 3 and the capture start position of the whole picture display 102 is calculated.

In step S113, the pan part 4*a* and tilt part 4*b* are controlled based on the distance calculated in step S112 to direct the lens optical axis of the camera unit 3 to the center of the frame serving as the capture start position.

In step S114, it is determined whether the number of updates of the whole picture display 102 has reached the predetermined number of updates. Specifically, it is determined whether the SELECT mode or RUN mode is selected in the REC MODE selection menu 118. If it is determined that the SELECT mode is selected in the REC MODE selection menu 118, the algorithm proceeds to step S115. If it is determined that the RUN mode is selected in the REC MODE selection menu 118, the algorithm proceeds to step S117.

If the SELECT mod is selected in the REC MODE selection menu 118, the predetermined number of updates is "1". All frames presented on the whole picture display 102 are captured, stored, and then displayed in only one cycle. Capturing, storage, and displaying of the frames are not repeated. In contrast, if the RUN mode is selected in the REC MODE selection menu 118, the number of updates is "infinite". The capturing, storage, and displaying of the frames are repeated until the capturing operation ends, i.e., until the STOP button 123 is pressed.

In step S115, the distance between the capture start position of the whole picture display 102 and the center of the whole picture display 102 is calculated. Based on the result of calculation, the pan part 4*a* and tilt part 4*b* are controlled to move the lens optical axis of the camera unit 3 to the center of the whole picture display 102. The center of the whole picture means the center position of the 8×16 frames, for example.

In step S116, the operation of the stepping motors of the pan part 4*a* and tilt part 4*b* is suspended. The control algorithm represented by the flow diagram thus ends.

In step S117, it is determined whether the end command of the capturing operation is issued. Specifically, it is determined whether the STOP button 123 is designated by the pointer. If it is determined that the STOP button 123 is designated by the pointer, the algorithm proceeds to step S115. If it is determined that the STOP button 123 is not designated by the pointer, the algorithm loops to step S103.

Figure 14:
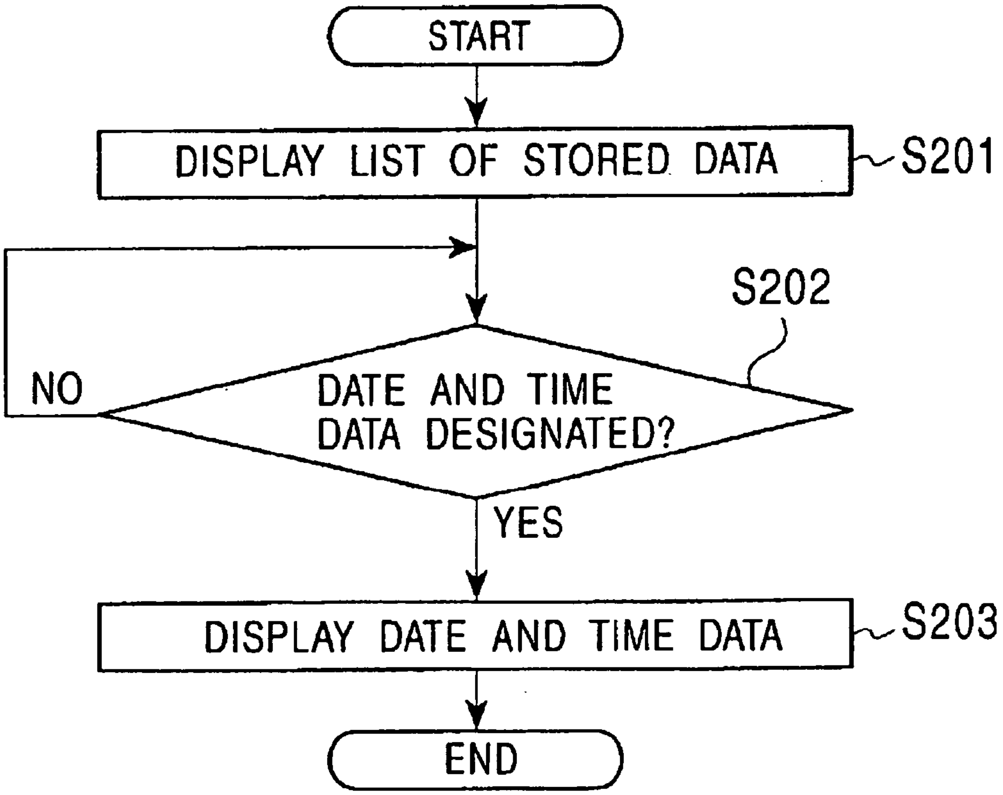
FIG. 14 is a flow diagram illustrating a reproduction operation of stored picture data in accordance with the embodiment of the present invention.

FIG. 14 is a flow diagram illustrating a reproduction operation of stored picture data in accordance with one embodiment of the present invention. If the VIEW MODE button 106 is designated by the pointer, and if the PLAY button 122 is designated by the pointer, the control algorithm represented by the flow diagram is invoked.

If the PLAY button 122 is designated by the pointer in step S201, the recorded data display screen appears in a pop-up window shown in FIG. 5, for example.

In step S202, it is determined whether the date is designated in the date box 164 and whether the time is designated in the time box 165. If it is determined that the data and time are respectively designated in the date box 164 and time box 165, the algorithm proceeds to step S203. If it is determined in step S202 that no date is designated in the date box 164 with no time designated in the time box 165, or if it is determined in step S202 that either the date or the time is not designated in the date box 164 or the time box 165 respectively, step S202 is repeated until both the data and the time are designated in the date box 164 and the time box 165, respectively.

In step S203, the coverage area picture and/or the whole picture are presented on the coverage area picture display 101 and/or the whole picture display 102 based on the recorded data at the designated date and time. The algorithm of the flow diagram then ends.

When the reproduction operation is retrospectively performed from the current time to past time, the VIEW MODE button 106 is designated by the pointer. The RUN mode is selected in the REC MODE selection menu 118, and the PLAY button 122 is designated by the pointer. In subsequent steps, the date and time of the recorded data with which the reproduction operation starts, and the date and time of the recorded data with which the reproduction operation ends are designated. In this way, data captured at the designated starting date and time to data captured at the designated ending date and time can be reproduced. It is also possible to reproduce recorded data in the order from a past point of time to current time.

Figure 15:
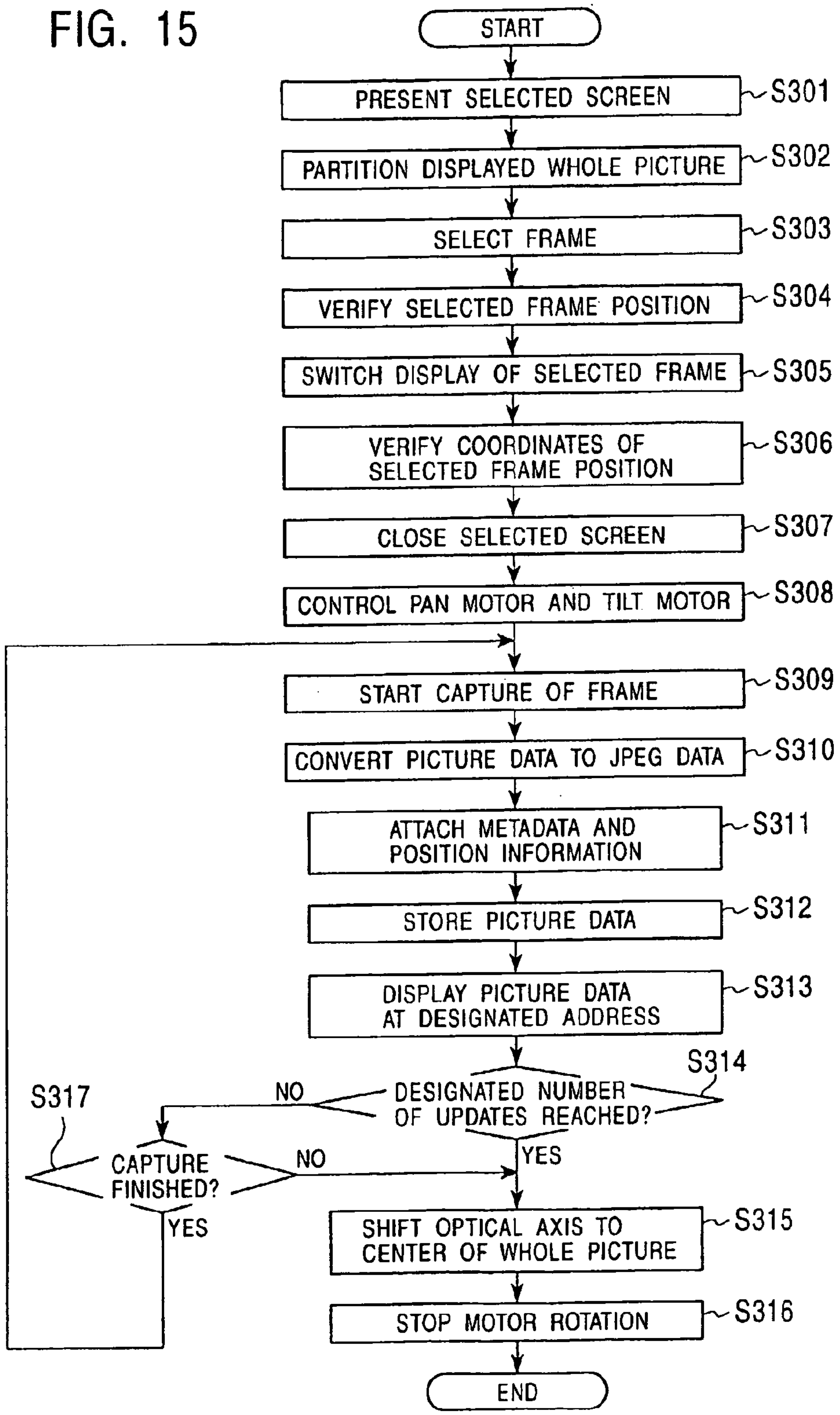
FIG. 15 is a flow diagram illustrating a capturing operation of one frame only from a photographing unit in accordance with the embodiment of the present invention.

FIG. 15 is a flow diagram illustrating a capturing operation of one frame only at a designated arbitrary position. If the LIVE MODE button 107 is designated with the pointer and if an arbitrary position in the whole picture display 102 is designated with the pointer, a control algorithm of the flow diagram is invoked.

If the SELECT button 117 is designated by the pointer in step S301, the SELECT display shown in FIG. 4 appears in a pop-up window format, for example.

In step S302, the whole picture presented on the whole picture display 102 is also presented on the SELECT display of the display screen 152. The picture presented on the display screen 152 has frame border lines along which each frame is captured. The whole picture presented on the whole picture display 102 may be shown segmented by the unit of frames according to which the whole picture is captured, on the display screen 152. Also, a grid of lines may be shown superimposed on the whole picture.

In step S303, a desired frame on the display screen 152 is designated using the pointer.

In step S304, it is determined where the selected frame is located in position within the display screen 152. The position of the selected frame is thus verified.

In step S305, for example, luminance of the selected frame is varied to allow the selected frame to be easily recognized on the display screen 152. Any means is acceptable as long as the selected frame is recognized. For example, the selected frame may be shown with a color difference signal thereof varied, with any or all of RGB signals thereof varied, with the color of an outline thereof changed, or with the outline thereof blinked.

In step S306, it is determined where the selected frame with the display thereof varied is located in position within the coverage area picture display 101, and the coordinates of the selected frame are thus verified.

In step S307, the closing buttons 151 and 153 are designated using the pointer, and the SELECT display is closed.

In step S308, the pan part 4*a* and tilt part 4*b* are controlled to move the lens optical axis of the camera unit 3 to the center position of the selected frame.

In step S309, the lens unit 22, focus-zoom-iris controller 23, and photographing unit 24 in the camera unit 3 are controlled to capture the frames and to feed the captured frames to the control computer 1 as the picture data.

In step S310, the picture data supplied from the camera unit 3 is converted into predetermined picture format data such as JPEG data.

In step S311, the metadata and position information are attached to the predetermined picture format data.

In step S312, the picture data, and the metadata and position information attached thereto are stored in the main memory 30.

In step S313, the picture data in the predetermined picture format is displayed at the designated address in the whole picture display 102.

In step S314, it is determined whether the number of updates of the single selected frame has reached the predetermined number of updates. Specifically, it is determined whether the SELECT mode or RUN mode is selected in the REC MODE selection menu 118. If it is determined that the SELECT mode is selected in the REC MODE selection menu 118, the algorithm proceeds to step S315. If it is determined that the RUN mode is selected in the REC MODE selection menu 118, the algorithm proceeds to step S317.

If the SELECT mod is selected in the REC MODE selection menu 118, the predetermined number of updates is “1”. The single selected frame is captured, stored, and then displayed in only one cycle. Capturing, storage, and displaying of the frame are not repeated. In contrast, if the RUN mode is selected in the REC MODE selection menu 118, the number of updates is “infinite”. The capturing, storage, and displaying of the frames are repeated until the capturing operation ends, i.e., until the STOP button 123 is pressed.

In step S315, the distance between the capture position of the single selected frame and the center of the whole picture display 102 is calculated. Based on the result of calculation, the pan part 4*a* and tilt part 4*b* are controlled to move the lens optical axis of the camera unit 3 to the center of the whole picture display 102. The center of the whole picture means the center position of the 8×16 frames, for example.

In step S316, the operation of the stepping motors of the pan part 4*a* and tilt part 4*b* is suspended. The control algorithm represented by the flow diagram thus ends.

Figure 16:
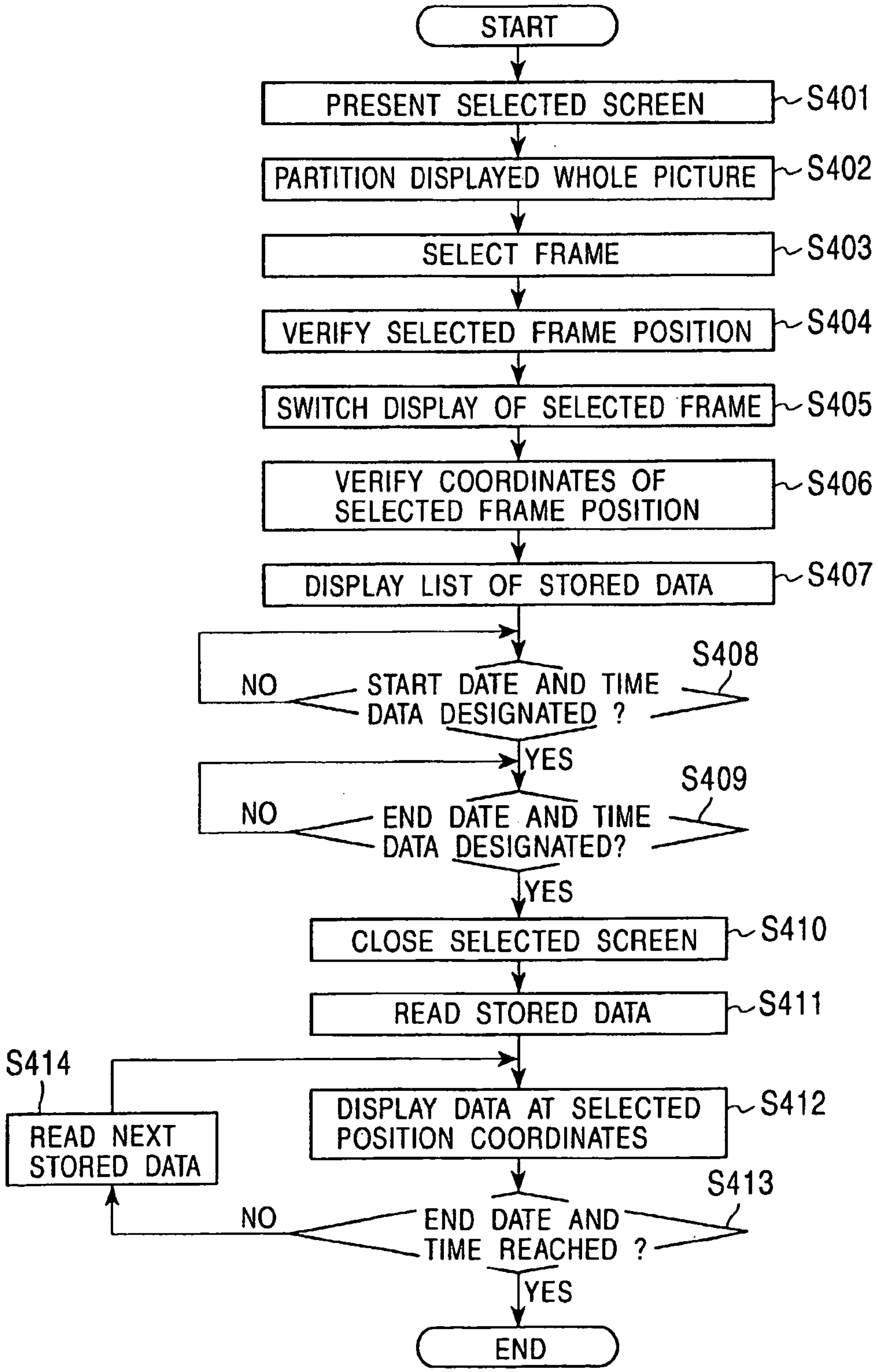
FIG. 16 is a flow diagram illustrating an operation in which one frame only is reproduced from stored picture data in accordance with the embodiment of the present invention.

In step S317, it is determined whether the end command of the capturing operation is issued. Specifically, it is determined whether the STOP button 123 is designated by the pointer. If it is determined that the STOP button 123 is designated by the pointer, the algorithm proceeds to step S315. If it is determined that the STOP button 123 is not designated by the pointer, the algorithm loops to step S309. FIG. 16 is a flow diagram illustrating an operation in which one frame only at an arbitrary position is reproduced from the recorded data in accordance with the embodiment of the present invention. An algorithm of the flow diagram shown in FIG. 16 is invoked if the VIEW MODE button 106 is designated using the pointer, if the RUN mode is selected in the REC MODE selection menu 118, and if any arbitrary position within the whole picture display 102 is designated using the pointer.

If the SELECT button 117 is designated by the pointer in step S401, the SELECT display shown in FIG. 4 appears in a pop-up window format, for example.

In step S402, the whole picture presented on the whole picture display 102 is also presented on the SELECT display of the display screen 152. The picture presented on the display screen 152 has frame border lines along which each frame is captured. The whole picture presented on the whole picture display 102 may be shown segmented by the unit of frames according to which the whole picture is captured, on the display screen 152. Also, a grid of lines may be shown superimposed on the whole picture.

In step S403, a desired frame on the display screen 152 is designated using the pointer.

In step S404, it is determined where the selected frame is located in position within the display screen 152. The position of the selected frame is thus verified.

In step S405, for example, luminance of the selected frame is varied to allow the selected frame to be easily recognized on the display screen 152. Any means is acceptable as long as the selected frame is recognized. For example, the selected frame may be shown with a color difference signal thereof varied, with any or all of RGB signals thereof varied, with the color of an outline thereof changed, or with the outline thereof blinked.

In step S406, it is determined where the selected frame with the display thereof varied is located in position within the coverage area picture display 101, and the coordinates of the selected frame are thus verified.

In step S407, the recorded data display screen illustrated in FIG. 5 appears in a pop-up window format.

In step S408, the date and time of recorded data with which a reproduction operation starts are designated. For example, the date of the recorded data with which the reproduction operation starts may be designated in the date box 164, and the time of the recorded data at which the reproduction operation starts may be designated in the time box 165. Desired recorded data may be selected from among the recorded data presented on the recorded data display area 166.

In step S409, the data and time of recorded data with which the reproduction operation ends are designated. For example, the date of the recorded data with which the reproduction operation ends may be designated in the date box 164, and the time of the recorded data at which the reproduction operation ends may be designated in the time box 165. Desired recorded data may be selected from among the recorded data presented on the recorded data display area 166. If the date and time of the recorded data with which the reproduction operation ends are not designated, all recorded data which is stored from the starting date and time are reproduced in retrospect.

In step S410, the closing button 151 or 153 is designated using the pointer, and the SELECT display is closed.

In step S411, the recorded data to be reproduced is read from the main memory 30. Alternatively, the recorded data may be read from the archive 10. Since a plurality of frames are stored in the archive 10 as one archive, the recorded data is decompressed, and then read.

In step S412, the frame at the selected coordinates in the read data is displayed at the selected coordinates on the whole picture display 102.

In step S413, it is determined whether it is the end date and time to end the reproduction operation. If it is determined that it is the end date and time to end the reproduction operation, the algorithm ends. If it is determined that it is not the end date and time, the algorithm proceeds to step S414.

In step S414, recorded data to be reproduced next is read.

The present invention is not limited to the above embodiment. Various changes and modifications are possible without departing from the scope of the present invention.

It is possible to reproduce, in retrospect, the data recorded from current time to a past point of time. It is also possible to reproduce the data recorded from a past point of time to current time.

The control computer 1 connected to the LAN 7 controls the camera unit 3 in the system. Only both the control computer 1 and the camera unit 3 may be of a mobile type.

In the above-referenced embodiment, the frames at any positions are consecutively photographed, stored, and displayed. Alternatively, the frames at any positions may be photographed, stored, and displayed at predetermined intervals.

In the above-referenced embodiment, the frames at any positions are consecutively photographed, stored, and displayed. Alternatively, the frames at any positions may be only photographed and displayed, but not being stored.

In the above-referenced embodiment, the frames at any positions are obtained from the recorded data in accordance with position coordinates. Alternatively, the frames at any positions may be obtained from the recorded data referencing the position information and/or the metadata attached to the frames.

In the above-referenced embodiment, the camera unit 3 is tilted downward to successively photograph the frames. Alternatively, the camera unit 3 may be tilted upward to successively photograph the frames. The camera unit 3 may be panned clockwise or counterclockwise to successively photograph the frames.

In the above-referenced embodiment, the frame at any arbitrary position is obtained from the recorded based on the position coordinates. Alternatively, the frames may be respectively numbered with reference numbers 1, 2, 3, . . . from the home position for identification, and a frame at any position may be obtained from the recorded data according the reference number.

The period of time required to capture the whole panorama picture is prevented from being prolonged because the picture photographing unit is not fully moved within the predetermined range. Since the coverage area picture with the picture photographing unit fully moved within the predetermined range is displayed, the photographing direction to obtain the picture of a desired area is easily set. Even if the picture being captured is dark, the photographing direction is easily set. The operability of the system is improved.

In accordance with the present invention, the entire picture within an area to be monitored is displayed, and the frame at any position is photographed, and displayed. The frame at any position is displayed in detail.

In accordance with the present invention, the entire picture within an area to be monitored is displayed, and the frames at any position acquired in the past are displayed in retrospect in the order from current time to a past point of time. The frame at any position is displayed in detail.

In accordance with the present invention, the entire picture within an area to be monitored is displayed, and the frames at any position acquired in the past are displayed in retrospect in the order from a past point of time to current time. The frame at any position is displayed in detail.

What is claimed is:

1. An apparatus comprising:

a controller unit adapted to access photographic data, the photographic data including a panorama picture; and a compression unit, coupled to the controller unit, adapted to compress the photographic data, to produce compressed picture data, wherein the controller unit stores, in a storage unit, one of a source picture including a plurality of still frame pictures photographed in a plurality of photographing directions within a predetermined coverage area and a picture which is obtained by compressing the source picture, and displays, on a picture display unit, a whole panorama picture generated from the one of the source picture and the compressed picture, wherein the controller unit indicates an arbitrary point from either the photographic data or the compressed picture data, and only a still frame picture at the indicated arbitrary point is read from one of the source picture and the compressed picture stored in the storage unit, and wherein the read still frame picture is displayed on the picture display unit at a predetermined position thereof, wherein when the still frame picture at the indicated arbitrary point is read, date and time of recorded data of one of the photographic data and the compressed picture data, stored in the storage unit, with which a reading operation starts are designated, the controller unit successively reads the photographic data or the compressed picture data in a sequence from the picture with the designated date and time to older pictures, and a still frame picture at the indicated arbitrary point is read from one of the photographic data and the compressed picture data each time one of the photographic data and the compressed picture data is read.

2. The apparatus as claimed in claim 1, further comprising:

a display unit, coupled to the controller unit, the display unit configured to display the photographic data.

3. The apparatus as claimed in claim 2, wherein the display unit displays a frame captured by the controller unit as a selected picture.

4. The apparatus as claimed in claim 1, wherein the sequence is forward.

5. The apparatus as claimed in claim 1, wherein the sequence is reverse.

6. An apparatus comprising:

a controller unit adapted to access photographic data, the photographic data including a panorama picture; and a compression unit, coupled to the controller unit, adapted to compress the photographic data, to produce compressed picture data, wherein the controller unit stores, in a storage unit, one of a source picture including a plurality of still frame pictures photographed in a plurality of photographing directions within a predetermined coverage area and a picture which is obtained by compressing the source picture, and displays, on a picture display unit, a whole panorama picture generated from the one of the source picture and the compressed picture, wherein the controller unit indicates an arbitrary point from either the photographic data or the compressed picture data, and only a still frame picture at the indicated arbitrary point is read from one of the source picture and the compressed picture stored in the storage unit, and wherein the read still frame picture is displayed on the picture display unit at a predetermined position thereof, wherein the controller unit designates date and time of recorded data of a picture to start a reading operation and date and time of recorded data of a picture to end the reading operation, the controller unit successively reads the photographic data or the compressed picture data in a sequence from the picture with the designated date and time to start the reading operation to the picture with the designated date and time to end the reading operation, and only a still frame picture at the indicated arbitrary point is read from one of the photographic data and the compressed picture data each time one of the picture data and the compressed picture data is read.

7. The apparatus as claimed in claim 6, further comprising:

a display unit, coupled to the controller unit, the display unit configured to display the photographic data.

8. A method comprising:

accessing photographic data, the photographic data including a panorama picture; and compressing the photographic data, to produce compressed picture data, storing, in a storage unit, one of a source picture including a plurality of still frame pictures photographed in a plurality of photographing directions within a predetermined coverage area and a picture which is obtained by compressing the source picture, displaying, on a picture display unit, a whole panorama picture generated from the one of the source picture and the compressed picture, indicating an arbitrary point from either the photographic data or the compressed picture data, wherein only a still frame picture at the indicated arbitrary point is read from one of the source picture and the compressed picture stored in the storage unit, and wherein the read still frame picture is displayed on the picture display unit at a predetermined position thereof, designating date and time of recorded data of one of the photographic data and the compressed picture data, stored in the storage unit, with which a reading operation starts, successively reading the photographic data or the compressed picture data in a sequence from the picture with the designated date and time to older pictures, and reading a still frame picture at the indicated arbitrary point from one of the photographic data and the compressed picture data each time one of the photographic data and the compressed picture data is read.

9. The method as claimed in claim 8, further comprising: displaying the photographic data.

10. The method as claimed in claim 9 wherein the displaying step includes displaying a captured frame as a selected picture.

11. The method as claimed in claim 8, wherein the sequence is forward.

12. The method as claimed in claim 8, wherein the sequence is reverse.

* * * * *